(12) United States Patent
Kim et al.

(10) Patent No.: US 8,861,633 B2
(45) Date of Patent: Oct. 14, 2014

(54) APPARATUS AND METHOD FOR ESTIMATING CHANNEL IN OFDM/OFDMA BASED WIRELESS COMMUNICATION SYSTEM

(75) Inventors: Byung-Chul Kim, Yongin-si (KR); Zheng Zi Li, Seongnam-si (KR); Sang-Bae Ji, Yongin-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 13/593,120

(22) Filed: Aug. 23, 2012

(65) Prior Publication Data
US 2013/0034175 A1    Feb. 7, 2013

Related U.S. Application Data

(63) Continuation of application No. 12/445,129, filed as application No. PCT/KR2007/004986 on Oct. 11, 2007, now abandoned.

(30) Foreign Application Priority Data

Oct. 11, 2006 (KR) .................. 10-2006-0098857
May 8, 2007 (KR) .................. 10-2007-0044723

(51) Int. Cl.
*H04B 7/02* (2006.01)
*H04L 1/02* (2006.01)
*H04L 5/00* (2006.01)
*H04L 25/02* (2006.01)
*H04L 27/26* (2006.01)

(52) U.S. Cl.
CPC .......... *H04L 25/0204* (2013.01); *H04L 5/0048* (2013.01); *H04L 27/2613* (2013.01); *H04L 27/2657* (2013.01); *H04L 25/022* (2013.01); *H04L 27/2662* (2013.01); *H04L 27/2675* (2013.01); *H04L 5/0042* (2013.01); *H04L 25/0232* (2013.01)
USPC .......................... 375/267; 375/347; 375/349

(58) Field of Classification Search
CPC .............. H04L 5/0048; H04L 25/0204; H04L 25/0212; H04L 25/022; H04L 27/2675
USPC .......... 375/260, 267, 299, 346, 347, 349, 350
See application file for complete search history.

(56) References Cited

U.S. PATENT DOCUMENTS

| | | | | |
|---|---|---|---|---|
| 7,428,267 | B2 * | 9/2008 | Lee et al. | 375/260 |
| 7,551,547 | B2 * | 6/2009 | Ghosh | 370/208 |
| 7,647,073 | B2 * | 1/2010 | Sung et al. | 455/562.1 |
| 7,702,028 | B2 * | 4/2010 | Zhou et al. | 375/267 |
| 2004/0005022 | A1 * | 1/2004 | Zhu et al. | 375/365 |
| 2004/0233871 | A1 * | 11/2004 | Seki et al. | 370/331 |
| 2004/0252796 | A1 * | 12/2004 | Dabak et al. | 375/347 |
| 2008/0253279 | A1 * | 10/2008 | Ma et al. | 370/206 |
| 2009/0147868 | A1 * | 6/2009 | Ihm et al. | 375/260 |

* cited by examiner

*Primary Examiner* — David B Lugo
(74) *Attorney, Agent, or Firm* — Sughrue Mion, PLLC

(57) ABSTRACT

A method for transmitting pilots in a wireless communication system includes generating first two pilots for a first antenna. Second two pilots for a second antenna are generated by multiplying the first two pilots with two weight values respectively. The first two pilots are transmitted over two Orthogonal Frequency Division Multiplexing (OFDM) symbols via the first antenna. The second two pilots are transmitted over the two OFDM symbols via the second antenna, wherein each weight value is determined based on a value used to obtain a symbol index of a corresponding OFDM symbol of the two OFDM symbols within a slot. Symbol indexes for the two OFDM symbols are consecutive, and the two weight values are different with each other.

13 Claims, 20 Drawing Sheets

(a) SISO (b) MIMO (a) Preamble transmission (b) Pilot transmission

APPARATUS AND METHOD FOR ESTIMATING CHANNEL IN OFDM/OFDMA BASED WIRELESS COMMUNICATION SYSTEM

TECHNICAL FIELD

The present invention relates to an apparatus and method for estimating a channel in a wireless communication system and, more particularly, to an apparatus and method for estimating a channel in a Multiple Input Multiple Output (MIMO) wireless communication system in which IEEE 802.16d/e, WiBro, and WiMAX standard specifications are used and Orthogonal Frequency Division Multiplexing (OFDM) or Orthogonal Frequency Division Multiplexing Access (OFDMA) is supported.

BACKGROUND ART

Mobile wireless channel environment includes a multi-path characteristic between a base station and a mobile station due to radio wave obstacles, which are distributed all around and have various sizes and materials, and also has a time-variable characteristic of a received signal since the mobile station or radio wave obstacles are moved.

A multi-path between the base station and the mobile station has paths of different lengths, and has a delay spread characteristic in which a received signal is lengthily extended. A wireless packet channel has time selective fading where a channel is varied according to time due to this characteristic and frequency selective fading having frequency components of different sizes and phases due to delay reception through multiple paths having a variety of lengths, resulting in the distortion of a transmission signal.

These channel characteristics have different sizes and phases according to time and path. In order to obtain an original transmission signal from a received signal, channel state information of the transmission signal, which is related to the signal distortion, needs to be known. As well known to those having ordinary skill in the art, a training symbol that is previously defined between a transmitter and a receiver is necessary in order to estimate a channel in a mobile station. In particular, training symbols that can be used in the downlink of systems to which the IEEE 802.16e standard is applied, or a Wibro system of the systems include a preamble and a pilot.

The preamble is transmitted through a first OFDMA symbol of the entire downlink frame, and the pilot is transmitted through the entire OFDMA symbols of a downlink frame except for the preamble. Therefore, in a communication mobile station, a channel has to be estimated by employing the preamble and/or the pilot, and an original transmission signal has to be acquired from a received signal by employing the estimated channel.

DISCLOSURE

Technical Problem

Accordingly, the present invention has been made to fulfill the above needs, and an object of the present invention is to provide an apparatus and method for estimating a channel in a MIMO wireless communication system supporting OFDM or OFDMA.

Another object of the present invention is to provide an apparatus and method for estimating a channel by employing a pilot channel estimation value of a downlink Partial Usage of Sub-Channels (PUSC) mode included in received signals received by a plurality of receiving antennas.

A further object of the present invention is to provide an apparatus and method for estimating a channel by employing a preamble channel estimation value and pilot channel estimation values of pilots transmitted from a plurality of transmitting antennas.

Yet another object of the present invention is to provide an apparatus and method for estimating a channel through interpolation of a preamble channel estimation value and a pilot channel estimation value.

Still another object of the present invention is to provide an apparatus and method for estimating a channel by carrying out an operation on a channel, which is estimated through interpolation of pilot channel estimation values, and a preamble channel estimation value and then employing the operation result.

Still another object of the present invention is to provide an apparatus and method for estimating a channel by employing the pattern of pilots in a wireless communication system supporting OFDM or OFDMA.

Still another object of the present invention is to provide a channel estimation apparatus and method, wherein a weight value according to the pattern of pilots is previously determined off-line in a MIMO wireless communication system supporting OFDM or OFDMA, thus reducing complexity when a receiving system estimate a channel.

Technical Solution

For the above objects, a channel estimation apparatus in a MIMO wireless communication system supporting OFDM or OFDMA according to an aspect of the present invention includes a first channel operation unit for carrying out an operation on pilot channel estimation values of pilots, which are transmitted from a transmitting antenna that transmits a preamble, as an improved pilot channel estimation value with respect to each of a plurality of receiving antennas by employing a preamble channel estimation value based on the preamble included in received signals received by the plurality of receiving antennas, respectively; a first channel estimation unit for estimating a channel for each of the receiving antennas through interpolation of a symbol axis and a frequency axis employing the improved pilot channel estimation value; and a second channel estimation unit for estimating a channel for each of the receiving antennas through interpolation of a symbol axis and a frequency axis employing pilot channel estimation values of pilots transmitted from the same transmitting antenna, of pilots transmitted from a transmitting antenna that does not transmit the preamble, of a plurality of transmitting antennas.

A channel estimation apparatus in a MIMO wireless communication system supporting OFDM or OFDMA according to an aspect of the present invention includes a first channel estimation unit for estimating a channel for each of a plurality of receiving antennas through interpolation of a symbol axis and a frequency axis employing pilot channel estimation values of pilots transmitted from a transmitting antenna, which transmits a preamble included in received signals received by the respective receiving antennas; a first channel operation unit for estimating an improved channel with respect to each of the receiving antennas through operation of the estimated channel estimation value and a preamble channel estimation value of the preamble; and a second channel estimation unit for estimating a channel for each of the receiving antennas through interpolation of a symbol axis and a frequency axis employing pilot channel estimation values of pilots transmitted from the same transmitting antenna, of pilots transmitted from a transmitting antenna that does not transmit the preamble, of a plurality of transmitting antennas.

A channel estimation apparatus in a MIMO wireless communication system supporting OFDM or OFDMA according to an aspect of the present invention includes a symbol index channel estimation unit for estimating a channel of a symbol axis with respect to each of a plurality of receiving antennas through interpolation of a symbol axis employing pilot channel estimation values of pilots transmitted from the same transmitting antenna, of pilots transmitted from a plurality of transmitting antennas; and a frequency axis channel estimation unit for estimating a channel of a frequency axis with respect to each of the receiving antennas through interpolation of the frequency axis employing the channel estimation value estimated as the symbol axis with respect to each of the receiving antennas.

A channel estimation apparatus in a MIMO wireless communication system supporting OFDM or OFDMA according to an aspect of the present invention includes a first channel operation unit for carrying out an operation on pilot channel estimation values of pilots as improved pilot channel estimation values by employing a preamble channel estimation value of a preamble, of the preamble and the pilots included in a first received signal received from a first transmitting antenna through a first receiving antenna; a first channel estimation unit for estimating a channel with respect to the first received signal through interpolation of a symbol axis and a frequency axis employing the improved pilot channel estimation value; and a second channel estimation unit for estimating a channel with respect to a second received signal, received from a second transmitting antenna through the first receiving antenna, through interpolation of a symbol axis and a frequency axis employing pilot channel estimation values based on pilots included in the second received signal.

A channel estimation apparatus in a MIMO wireless communication system supporting OFDM or OFDMA according to an aspect of the present invention includes a first channel estimation unit for estimating a channel with respect to a first received signal, received from a first transmitting antenna through a first receiving antenna, through interpolation of a symbol axis and a frequency axis employing pilot channel estimation values of pilots, of a preamble and the pilots included in the first received signal; a first channel operation unit for estimating an improved channel with respect to the first received signal through operation of the estimated channel estimation value and a preamble channel estimation value of the preamble; and a second channel estimation unit for estimating a channel with respect to a second received signal, received from a second transmitting antenna through the first receiving antenna, through interpolation of a symbol axis and a frequency axis employing a pilot channel estimation value based on pilots included in the second received signal.

A channel estimation apparatus in a MIMO wireless communication system supporting OFDM or OFDMA according to an aspect of the present invention includes first and second symbol axis channel estimation units for estimating channels of a symbol axis with respect to first and second received signals, respectively, which are received through a first receiving antenna, through interpolation of the symbol axis employing a pilot channel estimation value based on pilots included in the first and second received signals; and first and second frequency axis channel estimation units for estimating channels of a frequency axis with respect to the first and second received signals through interpolation of the frequency axis employing the channel estimation values of the symbol axis of the first and second received signals.

A channel estimation apparatus in a MIMO wireless communication system supporting OFDM or OFDMA according to an aspect of the present invention includes a TO estimation unit for estimating time offset using a received signal; a TO compensation unit for compensating for phase error using the estimated time offset; a weight value storage unit configured to store predetermined calculated weight values; and at least one channel estimation unit for estimating a channel of the received signal by employing the product of pilot channel estimation values, with respect to the received signal whose time offset has been compensated for, and the weight values.

A channel estimation method in a MIMO wireless communication system supporting OFDM or OFDMA according to an aspect of the present invention includes the steps of carrying out an operation on pilot channel estimation values of pilots, which are transmitted from a transmitting antenna that transmits a preamble, as an improved pilot channel estimation value with respect to each of a plurality of receiving antennas by employing a preamble channel estimation value based on the preamble included in received signals received by the plurality of receiving antennas, respectively; estimating a channel for each of the receiving antennas through interpolation of a symbol axis and a frequency axis employing the improved pilot channel estimation value; and estimating a channel for each of the receiving antennas through interpolation of a symbol axis and a frequency axis employing pilot channel estimation values of pilots transmitted from the same transmitting antenna, of pilots transmitted from a transmitting antenna that does not transmit the preamble, of a plurality of transmitting antennas.

A channel estimation method in a MIMO wireless communication system supporting OFDM or OFDMA according to an aspect of the present invention includes the steps of estimating a channel for each of a plurality of receiving antennas through interpolation of a symbol axis and a frequency axis employing pilot channel estimation values of pilots transmitted from a transmitting antenna, which transmits a preamble included in received signals received by the respective receiving antennas; estimating an improved channel with respect to each of the receiving antennas through operation of the estimated channel estimation value and a preamble channel estimation value of the preamble; and estimating a channel for each of the receiving antennas through interpolation of a symbol axis and a frequency axis employing pilot channel estimation values of pilots transmitted from the same transmitting antenna, of pilots transmitted from a transmitting antenna that does not transmit the preamble, of a plurality of transmitting antennas.

A channel estimation method in a MIMO wireless communication system supporting OFDM or OFDMA according to an aspect of the present invention includes the steps of estimating a channel of a symbol axis with respect to each of a plurality of receiving antennas through interpolation of a symbol axis employing pilot channel estimation values of pilots transmitted from the same transmitting antenna, of pilots transmitted from a plurality of transmitting antennas; and estimating a channel of a frequency axis with respect to each of the receiving antennas through interpolation of the frequency axis employing the channel estimation value estimated as the symbol axis with respect to each of the receiving antennas.

A channel estimation method in a MIMO wireless communication system supporting OFDM or OFDMA according to an aspect of the present invention includes the steps of (a) compensating for error according to time offset and/or carrier frequency offset by extracting pilots from a received signal; and (b) estimating a channel with respect to the received signal by employing the product of channel estimation values of the pilots whose error has been compensated for and predetermined weight values.

Advantageous Effects

Accordingly, the present invention has an advantage in that it can increase the accuracy of channel estimation by employing a preamble channel estimation value of a preamble and pilot channel estimation values of pilots transmitted from a plurality of transmitting antennas in a MIMO communication system.

Furthermore, the present invention can estimate a channel by employing a pilot channel estimation value of a downlink PUSC channel mode included in received signals received by a plurality of receiving antennas.

Further, the present invention accuracy of channel estimation by estimating a channel through interpolation of a preamble channel estimation value and a pilot channel estimation value.

Furthermore, the present invention accuracy of channel estimation by carrying out an operation on a channel estimated through interpolation between a pilot channel estimation value and a preamble channel estimation value.

Further, the present invention channel estimation by estimating a channel by setting weight values differently according to pilot patterns.

DESCRIPTION OF DRAWINGS

FIG. 6 is a view illustrating pilot patterns of a downlink PUSC mode, which are respectively transmitted by a first transmitting antenna and a second transmitting antenna in the 2×2 MIMO system in relation to FIG. 2;

FIG. 7 is a view illustrating a pilot and a data pattern received by the receiving antenna;

MODE FOR INVENTION

The present invention will now be described in detail in connection with preferred embodiments with reference to the accompanying drawings. For reference, in the following description, detailed description on the known functions and constructions, which may make the gist of the present invention unnecessarily vague, will be omitted.

Before detailed description, the term "communication mobile station" used in this specification refers to a communication mobile station that supports an OFDM scheme or an OFDMA scheme, preferably, a communication mobile station that supports PUSC, Full Usage of Sub-Channels (FUSC), and Band Adaptation Modulation Coding (AMC) channel modes in a wireless communication system that uses IEEE 802.16d/e, WiBro, and WiMAX standard specifications. Further, only the PUSC channel mode is described in the detailed description of the present invention. However, the present invention may also be applied to the FUSC and Band Adaptive Modulation Coding (AMC) channel modes.

Further, the term "wireless communication system" used in this specification may refer to a system based on one of IEEE 802.16d/e standard, WiBro, and WiMAX.

Further, the term "symbol" used in this specification refers to an OFDMA or OFDM symbol.

Figure 1:
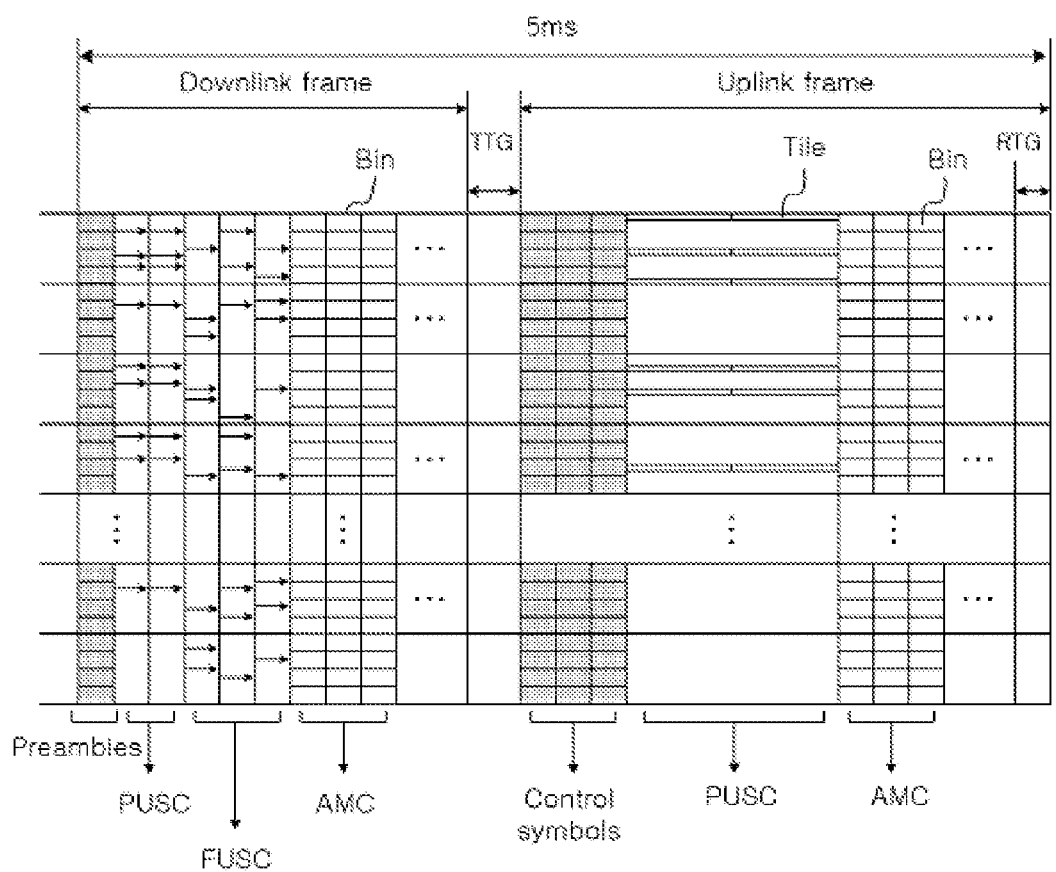
FIG. 1 is a view illustrating an example of a frame structure used in an IEEE 802.16d/e-based portable Internet system.

FIG. 1 is a view illustrating an example of a frame structure used in the IEEE 802.16d/e-based portable Internet system. In the portable Internet system employing a TDD method, one frame is time-divided for transmission and reception.

Referring to FIG. 1, one frame is divided into a downlink frame where data is transmitted from a base station to a terminal and an uplink frame where data is transmitted from the terminal to the base station. A Transmit/receive Transition Gap (TTG) and a Receive/transmit Transition Gap (RTG) are inserted between the downlink frame and the uplink frame. In the illustrated example, the downlink frame includes at least one of a preamble region, a PUSC region, a FUSC region, and an AMC subchannel region, and the uplink frame includes at least one of a control symbol region, a PUSC region, and an AMC subchannel region.

Figure 2:
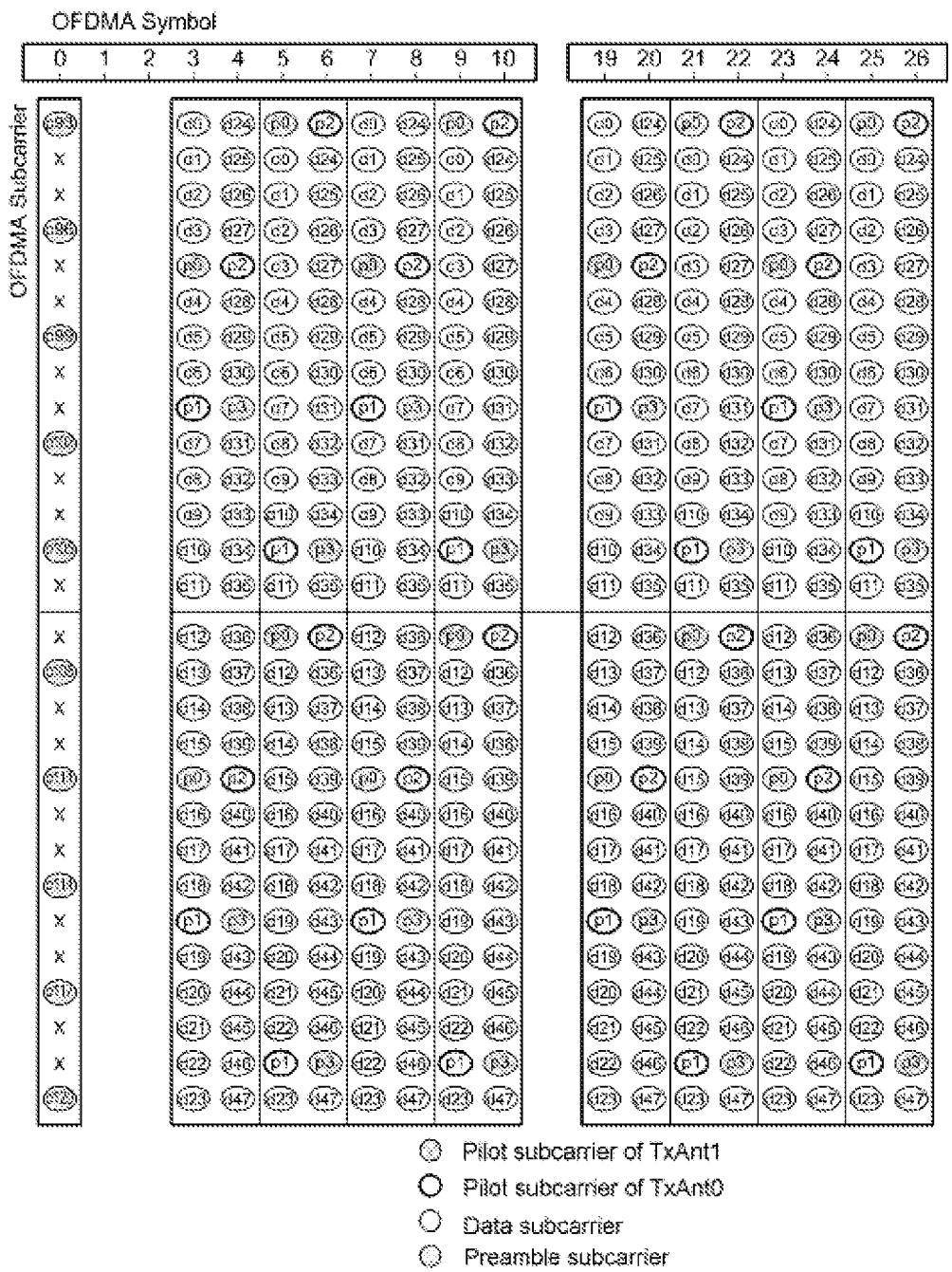
FIG. 2 is a view illustrating an example of preambles and pilots of a downlink PUSC mode of FIG. 1.

In particular, in relation to the present invention, if it is sought to employ 1024 Fast Fourier Transform (FFT) of a subcarrier allocation method relating to the downlink PUSC mode, allocation can be performed as in the following table 1. FIG. 2 illustrates part of a subcarrier allocation structure according to Table 1.

TABLE 1

| Parameter | Value | Comments |
| --- | --- | --- |
| Number of DC Subcarriers | 1 | Index 512 |
| Number of Guard Subcarriers, Left | 92 | |
| Number of Guard Subcarriers, Right | 91 | |
| Number of Used Subcarriers | 840 | Number of all Subcarriers used within a Symbol, including all possible allocated pilots and data Subcarrier. |
| Pilots | 120 | |
| Number of data Subcarriers | 720 | |
| Number of Used Subcarriers per Subchannel | 24 | |
| Number of Subchannels | 30 | |

Referring to Table 1 and FIG. 2, in the downlink PUSC mode using 1024 FFT, 91 and 92 subcarriers on the right and left sides, of a total of 1024 subcarriers, are used as guard periods for mitigating interference between neighboring channels, and one of the 1024 subcarriers is used as a DC subcarrier. Further, 840 subcarriers other than the above subcarriers are used as valid subcarriers, 120 subcarriers of the 840 subcarriers are used as pilots, and the remaining 720 subcarriers are used for data transmission.

The downlink PUSC mode is defined over 2 symbol periods that are consecutive on the time axis, and includes a Frame Control Header (FCH) for transmitting frame configuration information. Furthermore, the downlink PUSC zone comprises subcarriers distributed on the frequency axis, and one downlink PUSC subchannel includes 4 pilot subcarriers and 48 data subcarriers. Further, the basic configuration unit of the downlink PUSC subchannel is a cluster. In the cluster, all subcarriers other than the null subcarriers and the DC subcarriers are blocked into 14 neighboring subcarriers.

Meanwhile, the present invention is applied to a MIMO system for carrying out MIMO transmission using a plurality of transmitting antennas and a plurality of receiving antennas. The MIMO system is described below with reference to FIGS. 3 to 7.

Figure 3:
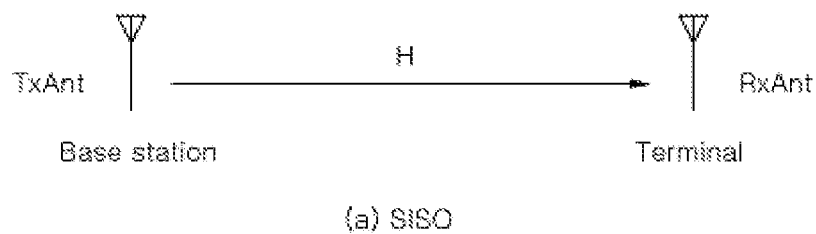
FIG. 3 is a view illustrating the concept of a Single Input Single Output (SISO) system and a MIMO system.
Figure 3:
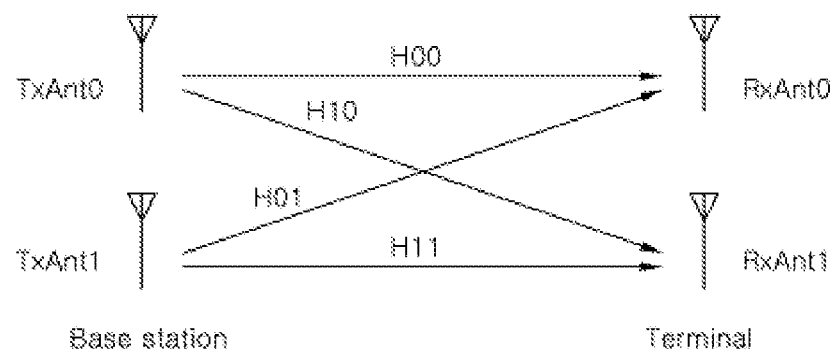

FIG. 3 is a view illustrating the concepts of the SISO system and the MIMO system.

As illustrated in FIG. 3(a), the SISO system is configured to perform single I/O transmission through one channel H, which is formed between a transmitting antenna TxAnt and a receiving antenna RxAnt.

Unlike the above configuration, the MIMO system is configured to perform MIMO transmission through a plurality of channels, which are formed between a plurality of transmitting antennas and a plurality of receiving antennas. FIG. 3(b) illustrates a 2×2 MIMO system using two transmitting antennas and two receiving antennas, of the plurality of transmit and receiving antennas. As illustrated in the drawing, four channels (that is, a first channel H00, a second channel H01, a third channel H10, and a fourth channel H11) are formed between the first and second transmitting antennas TxAnt0 and TxAnt1, and the first and second receiving antennas RxAnt0 and RxAnt1. For reference, in the channel sign 'H00', the first index 0 is related to the index of a receiving antenna and the second index 0 is concerned with the index of a transmitting antenna.

Figure 4:
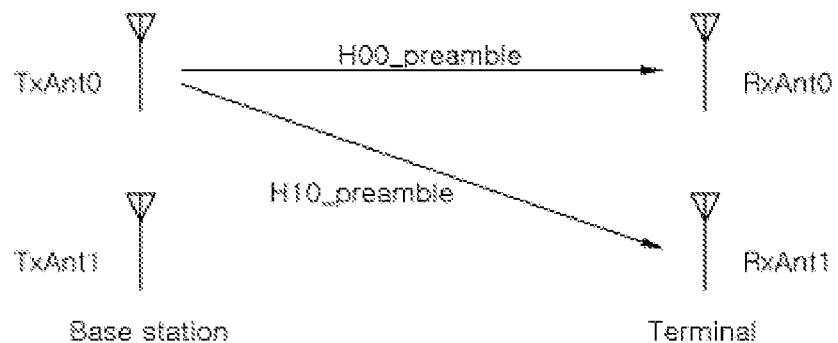
FIG. 4 is a view illustrating a signal transmission method between a transmitting antenna and a receiving antenna in a 2×2 MIMO system.
Figure 4:
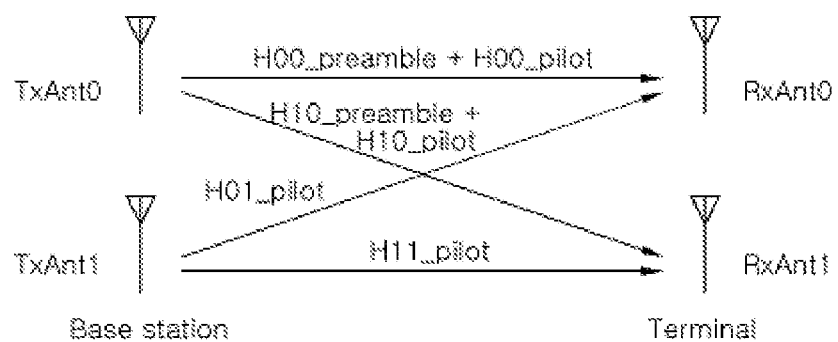

A method of transmitting the signal of the 2×2 MIMO system is described in detail below with reference to FIG. 4.

In the downlink period, a base station (or a radio access station) transmits signals through the two transmitting antennas TxAnt0 and TxAnt1, and a mobile station (or a portable subscriber station) receives the signals through the two receiving antennas RxAnt0 and RxAnt1. In this case, one antenna TxAnt0 of the two transmitting antennas transmits preambles. The first receiving antenna RxAnt0 and the second receiving antenna RxAnt1 receive the preambles through the first channel H00 and the third channel H10, respectively (refer to FIG. 4(a)). Further, the first and second transmitting antennas TxAnt0 and TxAnt1 transmit pilots with different patterns. The first receiving antenna RxAnt0 receives the pilots, which are transmitted from the first and second transmitting antennas, through the first channel H00 and the second channel H01. The second receiving antenna RxAnt1 receives the pilots, which are transmitted from the first and second transmitting antennas, through the third channel H10 and the fourth channel H11 (refer to FIG. 4(b)).

Figure 5:
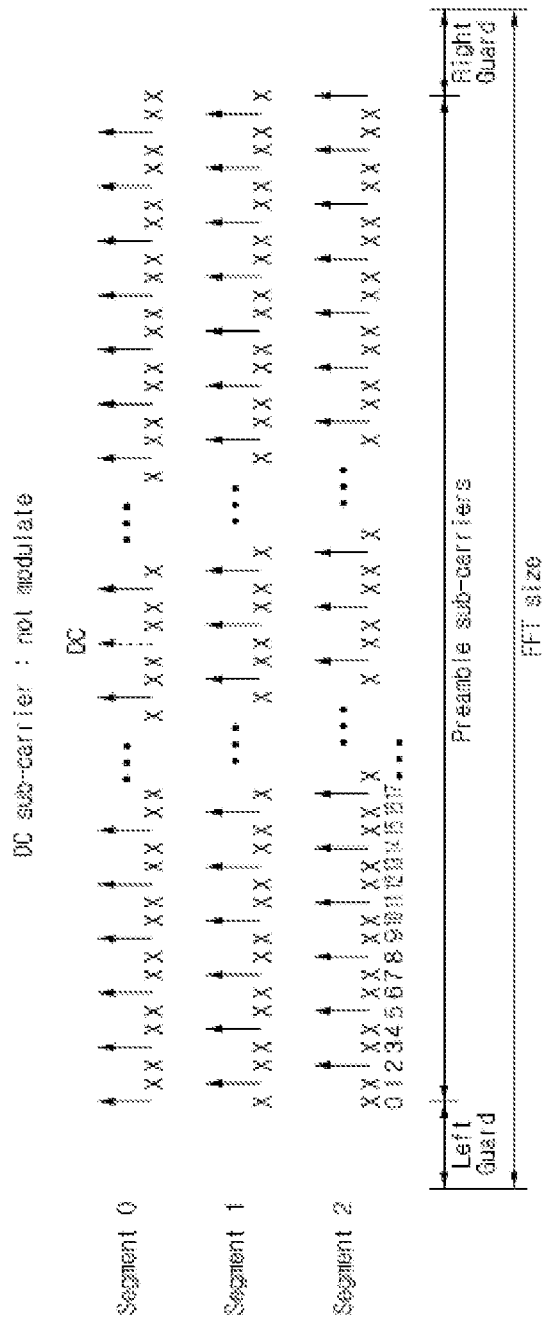
FIG. 5 is a view illustrating a transmission configuration of a preamble by a segment in accordance with the present invention.

For reference, FIG. 5 is a view illustrating a transmission configuration of a preamble by segments in accordance with the present invention. As illustrated in FIG. 5, guards for reducing interference between neighboring frequency bands are positioned on the left and right sides of a plurality of subcarriers, and DC subcarriers (that is, null subcarriers) are located.

Further, preamble subcarriers are positioned at predetermined intervals ("3" in FIG. 5) within one segment and can be used for initial synchronization, cell search, frequency offset, and channel estimation. A preamble signal has a signal level higher than that of a data signal and a pilot signal and can be easily acquired even under adverse channel conditions.

Figures 6, 7:
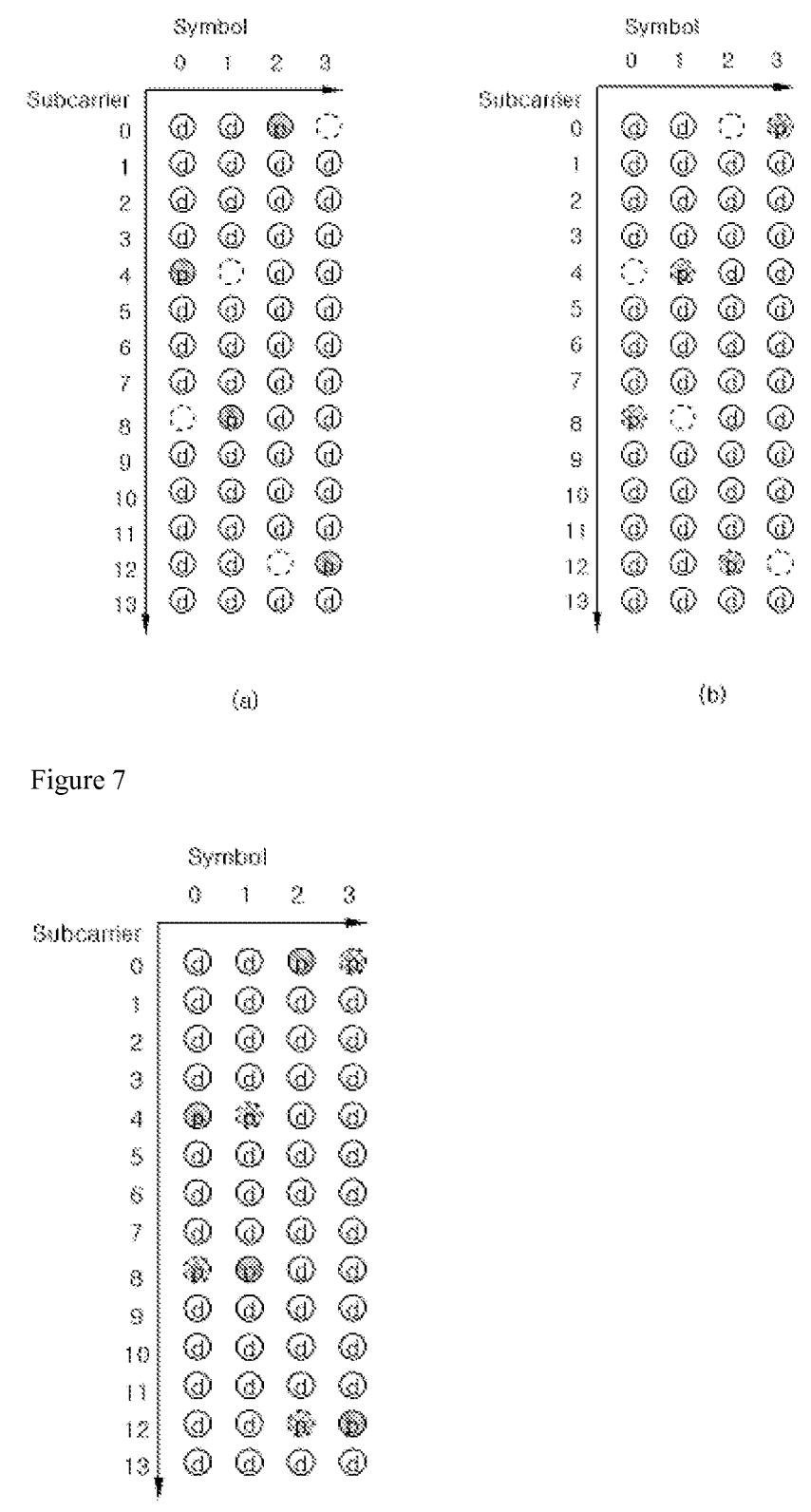

Meanwhile, FIG. 6 illustrates pilot patterns of the downlink PUSC mode, which are transmitted by the first transmitting antenna TxAnt0 and the second transmitting antenna TxAnt1, respectively. Each pilot pattern is a pilot pattern to which a Space Time Code (STC) is applied. In order to apply Spatial Multiplexing (SM), different pieces of data are transmitted on an antenna basis.

Referring to FIG. 6, the first transmitting antenna TxAnt0 transmits pilots and data according to a pattern illustrated in FIG. 6(a), and the second transmitting antenna TxAnt1 transmits pilots and data according to a pattern illustrated in FIG. 6(b). The first receiving antenna RxAnt0 receives first and second received signals (that is, received signals of the first and second channels) through the first and second channels H00 and H01, respectively, and the second receiving antenna RxAnt1 receives third and fourth received signals (that is, received signals of the third and fourth channels) through the third and fourth channels H10 and H11, respectively. Thus, the first and second receiving antennas RxAnt0 and RxAnt1 receive all signals, which is corresponding to a downlink frame, transmitted from the two transmitting antennas (a downlink frame).

In this case, the pilots and data pattern received by each receiving antenna are illustrated in FIG. 7.

Referring to FIG. 7, in the downlink PUSC mode in accordance with the present invention, the pilot pattern is repeated in a cycle of four symbols. The entire pilot patterns regarding the downlink PUSC mode can be represented by the following Equation 1. In this formula, "m" indicates a receiving antenna index and "$l_o$" indicates a symbol index. A formula 1-(1) and a formula 1-(3) indicate pilot patterns received through the first and second channels, respectively, and a formula 1-(2) and a formula 1-(4) indicate pilot patterns received through the third and fourth channels, respectively.

[Equation 1]

$$[P_m^{(i)}(4,l_0,0), P_m^{(q)}(4,l_0,0), P_m^{(i)}(8,l_0+1,0), P_m^{(q)}(8,l_0+1,0)], \ldots, [P_m^{(i)}(4,l_0,59), P_m^{(q)}(4,l_0,59), P_m^{(i)}(8,l_0+1,59), P_m^{(q)}(8,l_0+1,59)]$$ (1)

$$[P_m^{(i)}(8,l_0,0), P_m^{(q)}(8,l_0,0), P_m^{(i)}(4,l_0+1,0), P_m^{(q)}(4,l_0+1,0)], \ldots, [P_m^{(i)}(8,l_0,59), P_m^{(q)}(8,l_0,59), P_m^{(i)}(4,l_0+1,59), P_m^{(q)}(4,l_0+1,59)]$$ (2)

$$[P_m^{(i)}(0,l_0+2,0), P_m^{(q)}(0,l_0+2,0), P_m^{(i)}(12,l_0+3,0), P_m^{(q)}(12,l_0+3,0)], \ldots, [P_m^{(i)}(0,l_0+2,59), P_m^{(q)}(0,l_0,59), P_m^{(i)}(12,l_0+3,59), P_m^{(q)}(12,l_0+3,59)]$$ (3)

$$[P_m^{(i)}(12,l_0+2,0), P_m^{(q)}(12,l_0+2,0), P_m^{(i)}(0,l_0+3,0), P_m^{(q)}(0,l_0+3,0)], \ldots, [P_m^{(i)}(12,l_0+2,59), P_m^{(q)}(12,l_0,2,59), P_m^{(i)}(0,l_0+3,59), P_m^{(q)}(0,l_0+3,59)]$$ (4)

An apparatus and method for estimating a channel in accordance with a variety of embodiments of the present invention are described below with reference to FIGS. 8 to 26.

Figure 8:
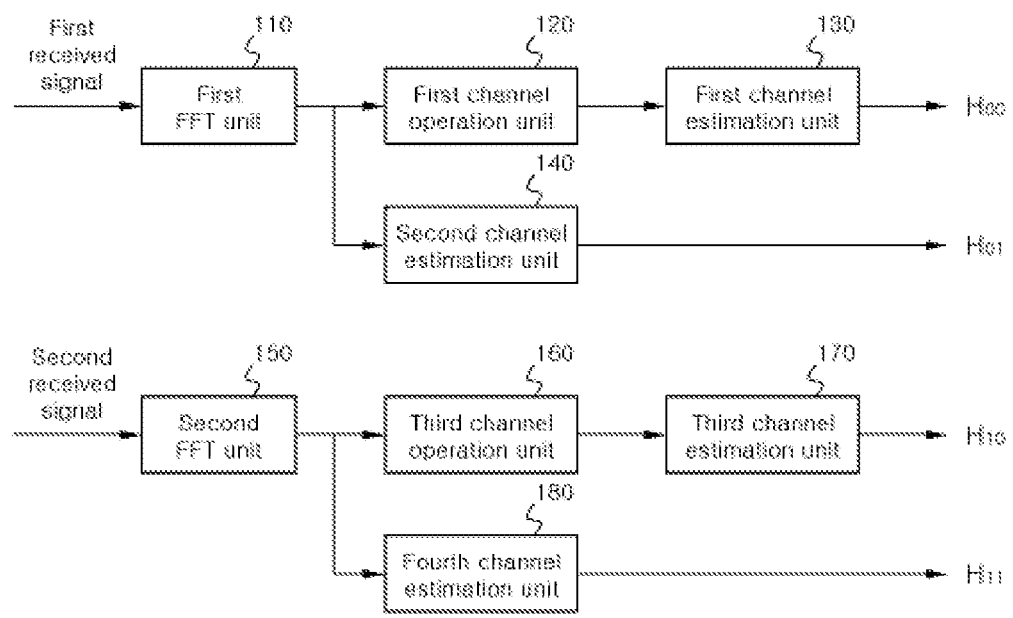
FIG. 8 is a construction block diagram with respect to a channel estimation apparatus according to an embodiment of the present invention.

FIG. 8 is a construction block diagram regarding the channel estimation apparatus according to a first embodiment of the present invention.

Referring to FIG. 8, the channel estimation apparatus of the present invention includes first and second FFT units 110 and 150, first and third channel operation units 120 and 160, first and third channel estimation units 130 and 170, and second and fourth channel estimation units 140 and 180.

The first and second FFT units 110 and 150 transform received signals with baseband (first and second received signals), which are received through first and second receiving antennas of a communication mobile station, respectively, into signals of frequency domain by performing FFT on the received signals. The baseband signals received through the first and second receiving antennas may be transformed into the signals of frequency domain through the first and second FFT units, respectively, but transformed into the signals of the frequency domain through one FFT unit.

The transformed received signal includes a preamble signal, a pilot signal, a data signal, and so on. The channel estimation apparatus in accordance with the present invention is configured to estimate a channel by employing a preamble and a pilot related to the downlink PUSC mode, included in the received signal.

The pilots, which are included in the received signals and received from the two transmitting antennas, have different pilot patterns.

The first channel operation unit 120 carries out an operation on a pilot channel estimation value of the pilots, which are transmitted from the first transmitting antenna, as an improved pilot channel estimation value by employing a preamble channel estimation value of the preamble, which is transmitted from the first transmitting antenna and received by the first receiving antenna. That is, the first channel operation unit 120 transforms the pilot channel estimation value into the improved pilot channel estimation value by carrying out an operation on the preamble channel estimation value of the preamble, which is transmitted from the first transmitting antenna and received by the first receiving antenna, and the pilot channel estimation value. In this case, only when a frequency where a subcarrier of the preamble channel estimation value is located is identical to a frequency where the pilot channel estimation value is located, an operation is carried out between the preamble channel estimation value and the pilot channel estimation value.

The improved pilot channel estimation value can be represented by the following Equation 2.

$$H(a,s) = W1(a,s) \times H\_pre(a,s) + W2(a,s) \times H\_pil(a,s)$$ [Equation 2]

where "H" indicates the improved pilot channel estimation value, "W1" indicates a preamble weight value, "H_pre" indicates the preamble channel estimation value, "W2" indicates a pilot weight value, "H_pil" indicates the pilot channel estimation values of the pilots transmitted from the transmitting antenna, "a" indicates a subcarrier index, and "s" indicates a symbol index. That is, H_pil indicates the pilot channel estimation values of the pilots transmitted the first transmitting antenna.

The preamble weight value and the pilot weight value can be represented by the following Equation 3.

$$W1 = \frac{1}{2^{\frac{symbol\ offset+2}{2}}}$$ [Equation 3]

$$W2 = 1 - W1$$

where symbol offset indicates symbol offset on the basis of a preamble.

The third channel operation unit 160 carries out the same operation as that of the first channel operation unit. In other words, the third channel operation unit 160 carries out an operation on the pilot channel estimation values of the pilots transmitted from the first transmitting antenna by employing the preamble channel estimation value of the preamble, which is transmitted from the first transmitting antenna and received by the second receiving antenna. Detailed description of the third channel operation unit is the same as that of the first channel operation unit, and will be thus omitted.

The first channel estimation unit 130 performs interpolation along a symbol axis and a frequency axis by employing the pilot channel estimation values of the pilots transmitted from the first transmitting antenna, which are improved by the first channel operation unit 120, and estimates the channel H00 through the performed interpolation along the symbol axis and the frequency axis.

Figure 9:
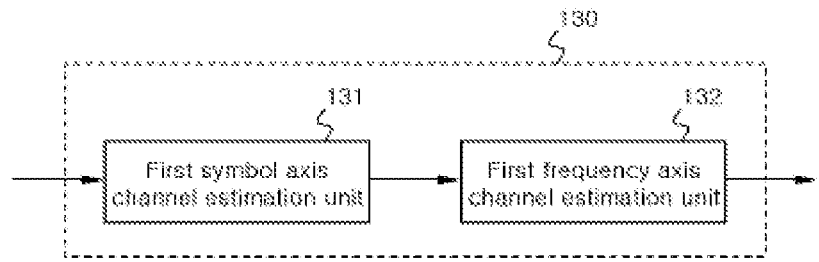
FIG. 9 is a detailed block diagram illustrating an embodiment of a first channel estimation unit illustrated in FIG. 8.

The first channel estimation unit 130 may be constructed as illustrated in FIG. 9.

FIG. 9 is a detailed block diagram of an embodiment regarding the first channel estimation unit illustrated in FIG. 8. Referring to FIG. 9, the first channel estimation unit 130 includes a first symbol index channel estimation unit 131 and a first frequency axis channel estimation unit 132.

The first symbol index channel estimation unit 131 estimates a channel of the symbol axis through interpolation of the symbol axis employing the pilot channel estimation value that has been improved by the first channel operation unit 120.

In the case of a channel not located between the improved pilot channel estimation values on the symbol axis, a pilot channel estimation value located at the nearest symbol index, of the improved pilot channel estimation values, can be copied to the channel not located between the improved pilot channel estimation values.

At this time, in the case of a channel located between an improved pilot channel estimation value having the smallest symbol index, of the improved pilot channel estimation values, on the symbol axis and the preamble channel estimation value, the channel can be estimated through interpolation of the improved pilot channel estimation value having the smallest symbol index and the preamble channel estimation value.

The first frequency axis channel estimation unit 132 estimates a channel of the frequency axis through interpolation of the frequency axis employing the channel estimated along the symbol axis.

At this time, in the case of a channel not located between the channels estimated as the symbol axis, the nearest channel of the channels estimated along the symbol axis can be copied to the channel not located between the estimated channels.

The second channel estimation unit 140 performs interpolation along the symbol axis and the frequency axis by employing the pilot channel estimation values of the pilots, which are transmitted from a transmitting antenna that does not transmit a preamble and received by the first receiving antenna, and estimates the channel H01 through interpolation as the performed symbol axis and the performed frequency axis. That is, the second channel estimation unit 140 performs interpolation along the symbol axis and the frequency axis by employing the pilot channel estimation values of the pilots, which are transmitted from the second transmitting antenna and received by the first receiving antenna, and estimates the channel H01 through interpolation as the performed symbol axis and the performed frequency axis.

Figure 10:
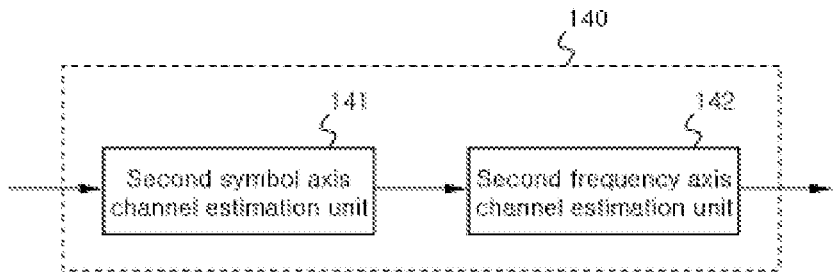
FIG. 10 is a detailed block diagram illustrating an embodiment of a second channel estimation unit illustrated in FIG. 8.

The second channel estimation unit 140 may be constructed as illustrated in FIG. 10.

FIG. 10 is a detailed block diagram of an embodiment regarding the second channel estimation unit illustrated in FIG. 8. Referring to FIG. 10, the second channel estimation unit 140 includes a second symbol index channel estimation unit 141 and a second frequency axis channel estimation unit 142.

The second symbol index channel estimation unit 141 estimates a channel of the symbol axis through interpolation of the symbol axis employing the pilot channel estimation values of the pilots transmitted from the second transmitting antenna.

At this time, in the case of a channel not located between the pilot channel estimation values of the pilots transmitted from the second transmitting antenna in the symbol axis, a pilot channel estimation value located at the nearest symbol index, of the pilot channel estimation values of the pilots transmitted from the second transmitting antenna, can be copied to the channel not located between the pilot channel estimation values of the pilots transmitted from the second transmitting antenna.

The second frequency axis channel estimation unit 142 estimates a channel of the frequency axis through interpolation of the frequency axis employing the channel estimated as the symbol axis.

At this time, in the case of a channel not located between the channels estimated as the symbol axis, the nearest channel of the channels estimated as the symbol axis can be copied to the channel not located between the estimated channels.

Referring back to FIG. 8, the third channel estimation unit 170 performs interpolation along the symbol axis and the frequency axis by employing the pilot channel estimation values of the pilots, which have been transmitted from the first transmitting antenna and improved in the third channel operation unit 160, and estimates the channel H01 through interpolation as the performed symbol axis and the performed frequency axis. The third channel estimation unit 170 is the same function as that of the first channel estimation unit and, therefore, detailed description thereof will be omitted.

The fourth channel estimation unit 180 performs interpolation along the symbol axis and the frequency axis by employing the pilot channel estimation values, which are transmitted from the second transmitting antenna and received by the second receiving antenna, and estimates the channel H11 through interpolation as the performed symbol axis and the performed frequency axis. The fourth channel estimation unit is the same function as that of the second channel estimation unit and, therefore, detailed description thereof will be omitted.

In other words, in the channel estimation apparatus in accordance with the present invention as illustrated in FIG. 8, in the case of a channel where a preamble is transmitted, an operation on pilot channel estimation values of pilots is carried out based on a preamble channel estimation value of a preamble, and a channel including the preamble is estimated through interpolation along a symbol axis and a frequency axis by employing an improved pilot channel estimation value acquired through the operation. In the case of a channel where only pilots are transmitted, a channel is estimated through interpolation along a symbol axis and a frequency axis by employing pilot channel estimation values of pilots.

The operation of FIG. 8 will be described in more detail below with reference to FIG. 2. In this case, only the received signals received by the first receiving antenna will be described.

FIG. 2 is an exemplary view the received signals received by the first receiving antenna and the pilot pattern of the downlink PUSC channel mode.

Referring to FIG. 2, in the event that the preamble channel estimation value of the preamble and the pilot channel estimation values of the pilots transmitted from the first transmitting antenna are located at the same frequency in the frequency axis (OFDMA subcarrier axis), the first channel operation unit illustrated in FIG. 8 carries out an operation on the pilot channel estimation value as an improved pilot channel estimation value based on the preamble channel estimation value. The operation of the improved pilot channel estimation value is carried out according to the above Equations 2 and 3.

For example, a preamble channel estimation value P93 and a pilot channel estimation value p2 located at a first subcarrier of a frequency axis, wherein the preamble channel estimation value and the pilot channel estimation value are located at the same frequency, are operated. In this case, by the Equation 3, an improved pilot channel estimation value of p2 is operated based on the Equation 2. That is, the improved pilot channel estimation value p2' of p2 is operated using p2'=W1×P93 W2×p2, so the pilot channel estimation value p2 is operated as the improved pilot channel estimation value p2'. In this case, since the preamble weight value W1 and the pilot weight value W2 are changed depending on a symbol index position of the pilot channel estimation value p2, the improved pilot channel estimation value p2' may vary.

On the other hand, since the pilot channel estimation value p2 located at a fifth subcarrier is not located at the same frequency as that of the preamble channel estimation value, an operation employing the preamble channel estimation value is not carried out.

Thus, the pilot channel estimation values p2 and p1 are corresponding to the same frequency as that of the preamble channel estimation value are operated as the improved pilot channel estimation values p2' and p1' according to the Equations 2 and 3.

If the operation on the pilot channel estimation values of the pilots transmitted from the first transmitting antenna is finished through the above process, the first symbol index channel estimation unit estimates a channel of the symbol axis by interpolating the pilot channel estimation value, which has been improved by the first channel operation unit, or the pilot channel estimation value that has not been improved as the symbol axis.

At this time, the nearest improved pilot channel estimation value or the nearest unimproved pilot channel estimation value can be copied to a channel not located between the improved pilot channel estimation values or the unimproved pilot channel estimation values. For example, in the first subcarrier, channels d0, d24, and p0 of the symbol indices 3, 4 and 5 are not located between the pilot channel estimation values of the pilots transmitted from the first transmitting antenna. Thus, the improved pilot channel estimation value p2' of the symbol index 5, which exists at the nearest place, is copied to the channels of the symbol indices 3, 4, and 5. In a ninth subcarrier, the pilot channel estimation value p1 of a symbol index 23 is copied to channels p3, d7, and d31 of symbol indices 24, 25 and 26.

In this case, a channel located between the preamble channel estimation value and the pilot channel estimation value, of channels not located between the improved pilot channel estimation values, can be interpolated by employing a preamble channel estimation value and an improved pilot channel estimation value. For example, in the first subcarrier, the channels d0, d24, and p0 of the symbol indices 3, 4 and 5 can be estimated through interpolation of the improved pilot channel estimation value p2' and the preamble channel estimation value P93 of a symbol index 6.

As described above, a channel of a symbol axis can be estimated through interpolation of the symbol axis where the pilot channel estimation values of the pilots p1, p2 transmitted from the first transmitting antenna exists.

If the channel of the symbol axis is estimated in the first symbol index channel estimation unit, a channel of a frequency axis is estimated through interpolation of the estimated channel of the symbol axis in the first frequency axis channel estimation unit.

At this time, in the case of a channel not located between the channels estimated as the symbol axis, the nearest channel of the channels estimated as the symbol axis can be copied to the channel not located between the estimated channels.

For example, in the pilot pattern illustrated in FIG. 2, an estimated channel located at a previous subcarrier can be copied to channels d23 and d47 located at the last subcarrier.

The channel H00 is estimated through this process.

Meanwhile, the channel H01 is estimated through the second symbol index channel estimation unit and the second frequency axis channel estimation unit. The channel is estimated by employing p0 and p3, that is, the pilot channel estimation values of the pilots transmitted from the second transmitting antenna.

Referring back to FIG. 2, the second symbol index channel estimation unit estimates a channel of a symbol axis where a pilot channel estimation value is located by interpolating the pilot channel estimation values p0 and p3 of the pilots transmitted from the second transmitting antenna along the symbol axis.

At this time, the nearest pilot channel estimation value can be copied to a channel not located between the pilot channel estimation values. For example, in the first subcarrier, the channels d0 and d24 of the symbol indices 3 and 4 are not located between the pilot channel estimation values of the pilots transmitted from the second transmitting antenna. Thus, the pilot channel estimation value p0 of the symbol index 5 located at the nearest position is copied to the channels of the symbol indices 3 and 4. Further, since the channel p2 of the symbol index 26 is also not located between the pilot channel estimation values of the pilots transmitted from the second transmitting antenna, the pilot channel estimation value p0 of the symbol index 25 is copied to the channel of the symbol index 26.

If the channel of the symbol axis is estimated in the second symbol index channel estimation unit, the second frequency axis channel estimation unit estimates a channel of a frequency axis by interpolating the estimated channel of the symbol axis as the frequency axis.

At this time, in the case of a channel not located between the channels estimated as the symbol axis, the nearest channel of the channels estimated as the symbol axis can be copied to the channel not located between the estimated channels. This operation is the same as the operation of the first frequency axis channel estimation unit and, therefore, detailed description thereof will be omitted.

Figure 11:
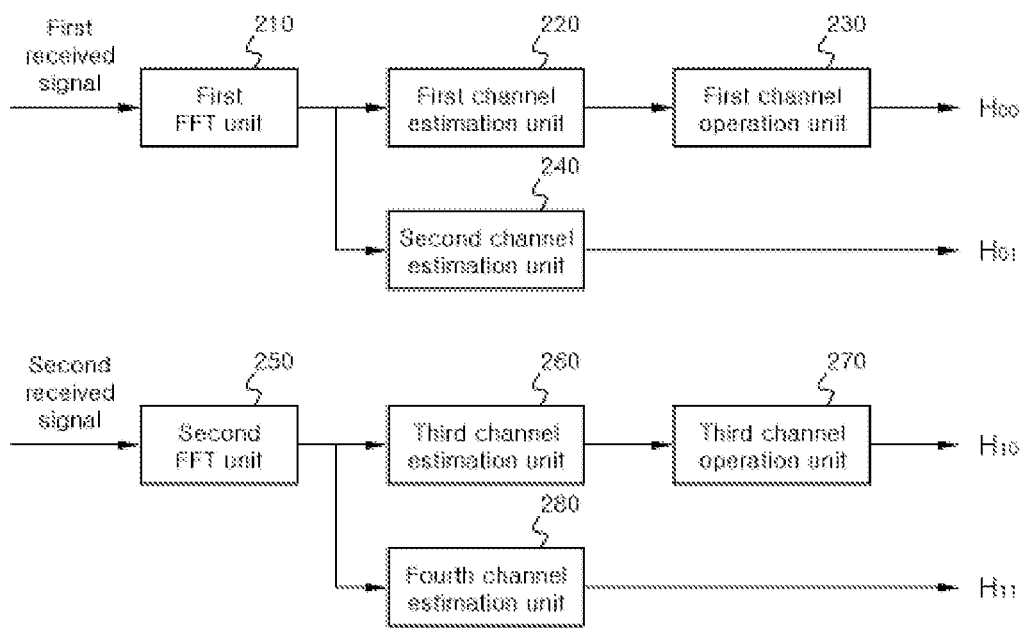
FIG. 11 is a construction block diagram with respect to a channel estimation apparatus according to a second embodiment of the present invention.

FIG. 11 is a construction block diagram with respect to a channel estimation apparatus according to a second embodiment of the present invention.

Referring to FIG. 11, the channel estimation apparatus in accordance with the present invention includes first and second FFT units 210 and 250, first and third channel estimation units 220 and 260, first and third channel operation units 230 and 270, and second and fourth channel estimation units 240 and 280.

When comparing the first channel estimation unit 220 and the first channel estimation unit 130 illustrated in FIG. 8, the first channel estimation unit 130 illustrated in FIG. 8 estimates a channel by employing a pilot channel estimation value improved based on a preamble channel estimation value, whereas the first channel estimation unit 220 illustrated in FIG. 11 estimates a channel by employing pilot channel estimation values of pilots transmitted from the first transmitting antenna.

The first and second FFT units 210 and 250 and the second and fourth channel estimation units 240 and 280 perform the same functions as those of the first and second FFT units and the second and fourth channel estimation units, respectively, illustrated in FIG. 8, and therefore detailed description on the first and second FFT units and the second and fourth channel estimation units is omitted.

Further, the first channel estimation unit 220 and the third channel estimation unit 260 have the same function, and the first channel operation unit 230 and the third channel operation unit 270 have the same function. Thus, detailed description on the third channel estimation unit and the third channel operation unit is omitted.

The first channel estimation unit 220 performs interpolation along a symbol axis and a frequency axis by employing pilot channel estimation values of pilots, which are transmitted from the first transmitting antenna and received by the first receiving antenna, and estimates a channel through the performed interpolation of the symbol axis and the frequency axis.

Figure 12:
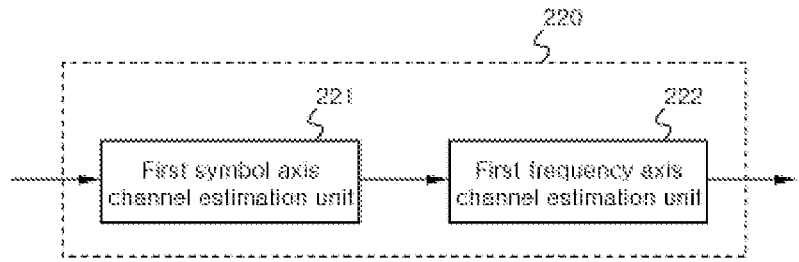
FIG. 12 is a detailed block diagram illustrating an embodiment of a first channel estimation unit illustrated in FIG. 11.

The first channel estimation unit may be constructed as illustrated in FIG. 12.

FIG. 12 is a detailed block diagram of an embodiment with respect to the first channel estimation unit illustrated in FIG. 11.

Referring to FIG. 12, the first channel estimation unit 220 includes a first symbol index channel estimation unit 221 and a first frequency axis channel estimation unit 222.

The first symbol index channel estimation unit 221 estimates a channel of the symbol axis through interpolation of the symbol axis employing pilot channel estimation values of pilots transmitted from the first transmitting antenna.

At this time, in the case of a channel not located between the pilot channel estimation values of the pilots transmitted from the first transmitting antenna in the symbol axis, a pilot channel estimation value located at the nearest symbol index, of the pilot channel estimation values of the pilots transmitted from the first transmitting antenna, can be copied to the channel not located between the pilot channel estimation values.

At this time, in the case of a channel located between a pilot channel estimation value having the smallest symbol index in the symbol axis, of the pilot channel estimation values of the pilots transmitted from the first transmitting antenna, and a preamble channel estimation value, the channel can be estimated through interpolation of the pilot channel estimation value having the smallest symbol index and the preamble channel estimation value.

The first frequency axis channel estimation unit 222 estimates a channel of a frequency axis through interpolation of the frequency axis employing the channel estimated as the symbol axis.

At this time, in the case of a channel not located between the channels estimated as the symbol axis, the nearest channel of the channels estimated as the symbol axis can be copied to the channel not located between the estimated channels.

As can be seen from FIG. 12, the first symbol index channel estimation unit and the first frequency axis channel estimation unit illustrated in FIG. 12 perform the same operations as those of the first symbol index channel estimation unit and the first frequency axis channel estimation unit illustrated in FIG. 9, but they differ in that whether a pilot channel estimation value used to estimate a channel employs a pilot channel estimation value improved based on a preamble channel estimation value or pilot channel estimation values of pilots transmitted from the first transmitting antenna.

Referring back to FIG. 11, the first channel operation unit 230 carries out an operation on the channel estimated by the first channel estimation unit 220 based on the preamble channel estimation value of the preamble transmitted from the first transmitting antenna. In other words, the first channel operation unit 230 estimates an improved channel by carrying out an operation on the estimated channel estimation value and the preamble channel estimation value.

In the operation of the estimated channel estimation value and the preamble channel estimation value, the estimated channel estimation value is converted into the improved channel estimation value only when the preamble channel estimation value and the estimated channel estimation value are located at the same frequency. At this time, a channel estimation value, which is estimated through interpolation of the pilot channel estimation values of the pilots transmitted from the first transmitting antenna and the preamble channel estimation value, of the estimated channel estimation values, is not operated along with the preamble channel estimation value. In other words, the estimated channel estimation value becomes an improved channel estimation value.

The improved channel estimation value can be represented by the following Equation 4.

$$H1(a,s) = W3(a,s) \times H\_pre(a,s) + W4(a,s) \times H\_pil1(a,s) \quad [\text{Equation 4}]$$

where "H1" indicates the improved channel estimation value, "W3" indicates the preamble weight value, "H_pre" indicates the preamble channel estimation value, "W4" indicates the estimated channel weight value, "H_pil" indicates the estimated channel estimation value, "a" indicates the subcarrier index, and "s" indicates the symbol index.

The preamble weight value and the estimated channel weight value can be represented by the following Equation 5.

$$W3 = \frac{1}{2^{\frac{symbol\ offset+2}{2}}} \quad [\text{Equation 5}]$$

$$W4 = 1 - W3$$

where the symbol offset indicates symbol offset on the basis of the preamble.

The first channel operation unit 230 is described below in more detail with reference to FIG. 2.

The first channel operation unit 230 carries out an operation on an estimated channel estimation value located at the same frequency (subcarrier) as that of a preamble channel estimation value of a preamble transmitted from the first transmitting antenna, of the channel estimation values estimated through interpolation of the symbol axis and the frequency axis employing the pilot channel estimation values p0 and p2 of the pilots transmitted from the first transmitting antenna, by employing the preamble channel estimation value. For example, the first channel operation unit 230 transforms an estimated channel estimation value into an improved channel estimation value by carrying out an operation on the preamble channel estimation value and the estimated channel estimation value in the first subcarrier, the fourth subcarrier, the seventh subcarrier, etc. where the preamble channel estimation value is located. In other words, the estimated channel estimation value located in the first subcarrier is transformed into an improved channel estimation value through an operation with the preamble channel estimation value P93. In this case, an operation employing the preamble channel estimation value P93 is carried out not only on the pilot channel estimation values of the pilots transmitted from the first transmitting antenna, but also estimated channel estimation values of other symbol indices, which are interpolated by the pilot channel estimation values of the pilots transmitted from the first transmitting antenna.

In this case, in the event that a channel estimation value located between the preamble channel estimation value P93 and the pilot channel estimation value p2 of the symbol index 6 is copied from the pilot channel estimation value p2 of the symbol index 6, an operation by the preamble channel estimation value P93 can also be carried out on the symbol indices 3, 4 and 5.

On the other hand, in the event that a channel estimation value located between the preamble channel estimation value P93 and the pilot channel estimation value p2 of the symbol index 6 is estimated through interpolation of the preamble channel estimation value P93 and the pilot channel estimation value p2 of the symbol index 6 in the first channel estimation unit 220, an operation on the estimated channel estimation values of the symbol indices 3, 4 and 5 employing the preamble channel estimation value P93 is omitted.

Figure 13:
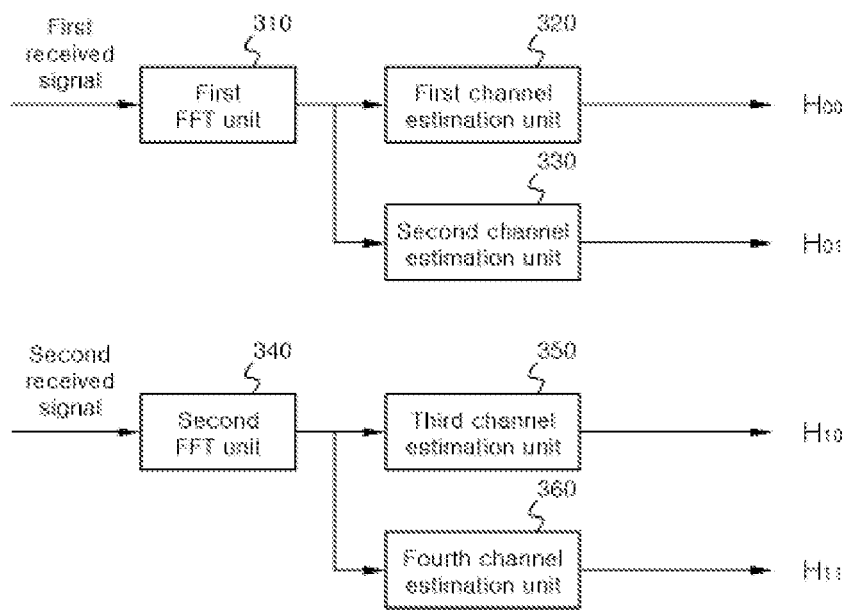
FIG. 13 is a construction block diagram with respect to a channel estimation apparatus according to a third embodiment of the present invention.

FIG. 13 is a construction block diagram regarding a channel estimation apparatus according to a third embodiment of the present invention.

Referring to FIG. 13, the channel estimation apparatus in accordance with the present invention includes first and second FFT units 310 and 340, and first, second, third, and fourth channel estimation units 320, 330, 350, and 360.

A channel is estimated by employing a preamble channel estimation value and a pilot channel estimation value in the above embodiments, whereas in the third embodiment of the present invention illustrated in FIG. 13, a channel is estimated by employing only pilot channel estimation values respectively transmitted from the transmitting antennas.

The first and second FFT units 310 and 340 perform the same functions as those of the first and second FFT units illustrated in FIG. 8 and, therefore, detailed description on the first and second FFT units is omitted.

The first, second, third, and fourth channel estimation units 320, 330, 350, and 360 estimate channels by employing pilot channel estimation values of pilots, which are received through respective channels and transmitted from the same transmitting antenna.

In other words, the first channel estimation unit 320 estimates the channel H00 by employing pilot channel estimation values of pilots, which are received by the first receiving antenna and transmitted from the first transmitting antenna.

The second channel estimation unit 330 estimates the channel H01 by employing pilot channel estimation values of pilots, which are received by the first receiving antenna and transmitted from the second transmitting antenna.

The third channel estimation unit 350 estimates the channel H10 by employing pilot channel estimation values of pilots, which are received by the second receiving antenna and transmitted from the first transmitting antenna.

The forth channel estimation unit 360 estimates the channel H11 by employing pilot channel estimation values of pilots, which are received by the second receiving antenna and transmitted from the second transmitting antenna.

As evident from the above, the entire channel estimation units 320, 330, 350, and 360 estimates channels by employing pilot channel estimation values of pilots transmitted through channels. Thus, only the first channel estimation unit is described below.

The first channel estimation unit 320 estimates the channel H00 through interpolation of the symbol axis and the frequency axis employing pilot channel estimation values of pilots transmitted from the first transmitting antenna.

Figure 14:
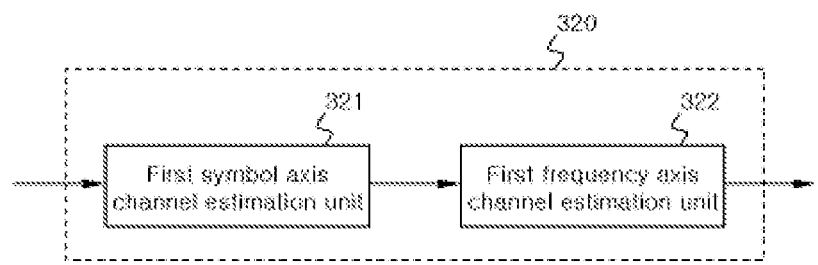
FIG. 14 is a detailed block diagram illustrating an embodiment of a first channel estimation unit of FIG. 13.

FIG. 14 is a detailed block diagram of an embodiment regarding the first channel estimation unit 320 illustrated in FIG. 13.

Referring to FIG. 14, the first channel estimation unit 320 includes a first symbol index channel estimation unit 321 and a first frequency axis channel estimation unit 322.

The first symbol index channel estimation unit 321 and the first frequency axis channel estimation unit 322 perform the same functions as those of the second symbol index channel estimation unit and the second frequency axis channel estimation unit illustrated in FIG. 10.

In other words, the first symbol index channel estimation unit 321 estimates a channel of the symbol axis through interpolation of the symbol axis employing pilot channel estimation values of pilots transmitted from the first transmitting antenna.

At this time, in the case of a channel not located between the pilot channel estimation values of the pilots transmitted from the first transmitting antenna in the symbol axis, a pilot channel estimation value located at the nearest symbol index, of the pilot channel estimation values of the pilots transmitted from the first transmitting antenna, can be copied to the channel not located between the pilot channel estimation values of the pilots transmitted from the first transmitting antenna.

The first frequency axis channel estimation unit 322 estimates a channel of the frequency axis through interpolation of the frequency axis employing the channel estimated as the symbol axis.

At this time, in the case of a channel not located between the channels estimated as the symbol axis, the nearest channel of the channels estimated as the symbol index can be copied to the channel not located between the estimated channels.

As described above, the channel estimation apparatus according to the third embodiment of the present invention can estimate a channel by employing pilot channel estimation values of pilots transmitted from a transmitting antenna or can estimate a channel by employing a preamble channel estimation value and pilot channel estimation values.

Figure 15:
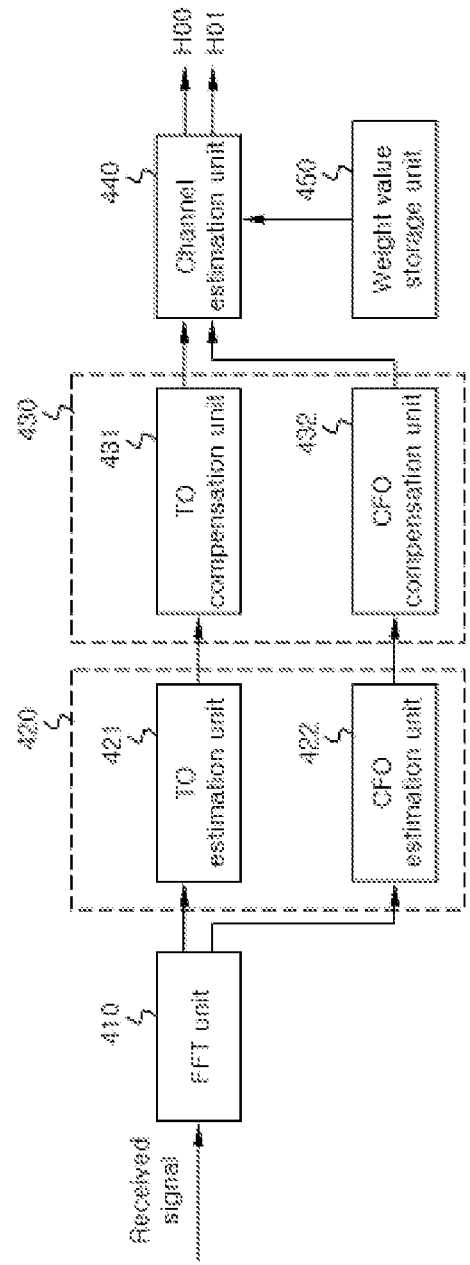
FIG. 15 is a construction block diagram with respect to a channel estimation apparatus according to a fourth embodiment of the present invention.

FIG. 15 is a construction block diagram with respect to a channel estimation apparatus according to a fourth embodiment of the present invention.the downlink PUSC mode applied to the present embodiment has a pilot pattern to which a STC is applied and in this mode, different pieces of data are transmitted on a transmitting-antenna basis in order to apply Spatial Multiplexing (SM).

As illustrated in FIG. 15, the channel estimation apparatus includes a FFT unit 410, an offset estimation unit 420, an offset compensation unit 430, a weight value storage unit 450, and a channel estimation unit 440.

The FFT unit 410 transforms signals of a time domain, of the baseband, which are received through a first channel and a second channel, into signals of a frequency domain. The FFT unit 410 transforms received signals of the first channel and the second channel, of a time domain, which are received through the first receiving antenna, into signals of a frequency domain. Though not illustrated in the drawing, it can be easily analogized that an additional FFT unit (not shown) for transforming the signals of a time domain into the signals of a frequency domain through a third channel and a fourth channel exists. Of course, one FFT unit can be used transform all signals of a time domain into signals of a frequency domain.

The offset estimation unit 420 estimates Time Offset (TO) and/or Carrier Frequency Offset (CFO) by employing the transformed signals of the frequency domain. The signal of the frequency domain, which has been transformed in the FFT unit 410, include a preamble, a pilot, data, and so on. The preamble is extracted in a preamble extraction unit (not shown), and the pilot is extracted in a pilot extraction unit (not shown) according to the Equation 1 and then input to the offset estimation unit 420. The offset estimation unit 420 estimates TO and CFO by employing the extracted preamble and pilot. The offset estimation unit 420 is classified into a TO estimation unit 421 for estimating TO, and a CFO estimation unit 422 for estimating CFO. They will be described later on.

The offset compensation unit 430 compensates for error occurring when the signals pass through the channels by employing the TO or CFO estimated in the offset estimation unit 420. The offset compensation unit 430 is classified into a TO compensation unit 431 for compensating for TO and a CFO compensation unit 432 for compensating for CFO. They will be described later on.

Meanwhile, the weight value storage unit 450 is configured to store a weight value operated through a subcluster-based channel response by employing pilots off-line. This is based on a combination of different ratios of pilots where channel characteristics within respective clusters are constant per subcluster basis. Weight values are previously found out by reflecting a high ratio to a pilot close to a subcluster and a low ratio to a pilot far from a subcluster by taking a subcarrier distance into consideration according to patterns of pilots adjacent to the subcluster, and are then stored in the weight value storage unit 450. Thus, a great amount of operations and operation time can be saved upon channel estimation. Further, it has been described that weight values in the present invention employ a constant pilot pattern per subcluster basis, but the weight values can be operated by combining the pilot pattern and the preamble pattern. This will be described in detail later on.

The channel estimation unit 440 estimates a channel based on the weight values stored in the weight value storage unit 450. In this case, the channel estimation unit 440 can find out a channel estimation value for each subcluster in the product of the channel responses of the pilots and the operated weight values. The channel estimation unit 440 estimates channels with respect to the first channel H00 and the second channel H01. Though not illustrated in the drawing, other channel estimation units for estimating channels with respect to the third channel H10 and the fourth channel H11 can also be easily analogized. The channel estimation unit 440 will also be described in detail later on.

On the other hand, although not illustrated in FIG. 15, the channel estimation apparatus according to the present embodiment may further include a TSC decoder (not shown) for decoding a TSC code coded on the transmission side and/or a SM decoder for decoding data, differently transmitted per antenna basis, which follow the channel estimation unit 440.

The construction of the channel estimation apparatus constructed above according to the fourth embodiment of the present invention is described in more detail.

Figure 16:
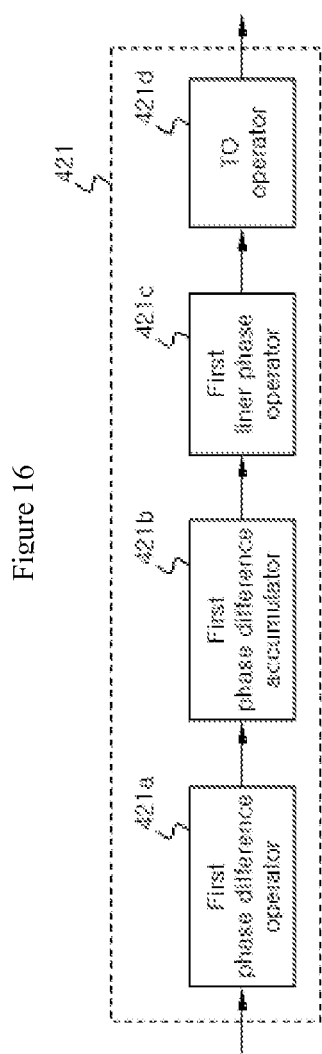
FIG. 16 is a detailed block diagram illustrating an embodiment regarding a TO estimation unit illustrated in FIG. 15.

FIG. 16 is a detailed block diagram illustrating an embodiment of the TO estimation unit of FIG. 15.

As illustrated in FIG. 16, the TO estimation unit 421 includes a first phase difference operator 421a, a first phase difference accumulator 421b, a first liner phase operator 421c, and a TO operator 421d.

The first phase difference operator 421a carries out an operation on a phase difference according to TO by employing at least two preambles included in at least one of received signals (first and second received signals) of the first and second channels, which are received through the first receiving antenna, and received signals (third and fourth received signals) of the third and fourth channels, which are received through the second receiving antenna. In this case, a combination of the at least two preambles and the at least two pilots may be employed. The first phase difference operator 421a may be implemented in the form of a multiplier for performing a conjugate multiplication on, for example, two complex numbers.

The first phase difference accumulator 421b accumulates the phase difference according to each TO, which is calculated in the first phase difference operator 421a, and generates a phase difference accumulation value. The first phase difference accumulator 421b can estimate more accurate TO by accumulating phase differences operated on a larger number of preambles. For reference, the first phase difference accumulator 421b may be implemented in the form of an adder.

The first liner phase operator 421c transforms the phase difference accumulation value, which is accumulated in the first phase difference accumulator 421b, into a linear phase $\Phi_{TO}$ according to TO. The phase difference accumulation value exists in the form of a complex number. Thus, the first liner phase operator 421c can find out the linear phase according to TO by transforming the phase difference accumulation value into a form having the real part as the denominator and the imaginary part as the numerator, performing an arctan operation on the transformed fraction form, and then dividing the result into as many as a subcarrier index difference (that is, the preamble position difference used in the phase difference operation). The arctan operation can be carried out by employing a look-up table using the ratio of the real part and the imaginary part of a complex number as an input and the resulting arctan operation value as an output. The linear phase can also be found out by employing other known operation methods. The linear phase $\Phi_{TO}$ for TO, which has been found out as described above, represents an average phase difference according to TO, which occurs between neighboring subcarriers (that is, subcarriers where the difference of sub-carrier indices is 1).

The TO operator 421d transforms the linear phase $\Phi_{TO}$ according to TO, which is operated in the first liner phase operator 421c, into TO. For example, in the event that 1024 FFT is used as in the present embodiment, TO can be calculated according to the following Equation 6.

$$TO = \Phi_{TO} \times \frac{1024}{2\pi} \quad \text{[Equation 6]}$$

A detailed example of the method of estimating TO is described below with reference to FIG. 2.

Referring to FIG. 2, the first symbol of the downlink frame is used as preambles. The preambles have a high signal level and the same symbol index and can be thus easily used to estimate a phase difference according to TO. FIG. 2 shows a preamble transmission configuration including three segments (segment 0, segment 1, and segment 2). Thus, the base station transmits a preamble subcarrier as a pattern corresponding to one of the three segments. Further, a left guard and a right guard for reducing interference between neighboring frequency bands are formed on the left and right sides of the preamble subcarrier. The first segment 0 includes a DC subcarrier (a preamble subcarrier index=142). It can also seen that a phase difference corresponding to three times the linear phase according to the TO occurs between neighboring preamble subcarriers in one segment (when the difference of the preamble index is 1), and a phase difference corresponding to six times the linear phase according to the TO occurs when the difference of the preamble index is 2. For reference, the following Equation 3 illustrates an example of the operation results of the linear phase according to the TO, which is operated in the first liner phase operator 421c through the first phase difference operator 421a and the first phase difference accumulator 421b. In the following Equation 7, P indicates a preamble subcarrier, "k" indicates a preamble subcarrier index, and "m" indicates a receiving antenna index.

$$\Phi_{T0} = \begin{cases} \frac{1}{6}\tan^{-1}\left\{\frac{\text{Im}\left\{\sum_{k=0}^{139}\sum_{m=0}^{1} P_m(k,0) \cdot P_m(k+2,0)^* + \sum_{k=143}^{281}\sum_{m=0}^{1} P_m(k,0) \cdot P_m(k+2,0)^*\right\}}{\text{Re}\left\{\sum_{k=0}^{139}\sum_{m=0}^{1} P_m(k,0) \cdot P_m(k+2,0)^* + \sum_{k=143}^{281}\sum_{m=0}^{1} P_m(k,0) \cdot P_m(k+2,0)^*\right\}}\right\} & \text{for Segment0} \\ \frac{1}{6}\tan^{-1}\left\{\frac{\text{Im}\left\{\sum_{k=0}^{139}\sum_{m=0}^{1} P_m(k,0) \cdot P_m(k+2,0)^* + \sum_{k=142}^{281}\sum_{m=0}^{1} P_m(k,0) \cdot P_m(k+2,0)^*\right\}}{\text{Re}\left\{\sum_{k=0}^{139}\sum_{m=0}^{1} P_m(k,0) \cdot P_m(k+2,0)^* + \sum_{k=142}^{281}\sum_{m=0}^{1} P_m(k,0) \cdot P_m(k+2,0)^*\right\}}\right\} & \text{for otherwise} \end{cases} \quad \text{[Equation 7]}$$

The linear phase $\Phi_{TO}$ according to the TO obtained as described above is transformed into a TO in the TO operator 421d. The TO is used to compensate for error according to the TO in the TO compensation unit 431 subsequently.

The embodiment according to the present invention may also employ a method of carrying out an operation on the phase difference according to the TO by employing a pilot pair having the same symbol index, a method of carrying out an operation on the phase difference according to the TO by employing two pairs of pilots having the same symbol index difference, and so on as well as the above TO estimation method.

On the other hand, referring back to FIG. 15, the TO compensation unit 431 compensates for error according to the TO by compensating for the phase of the received signal by employing the TO estimated in the TO estimation unit 421. Such TO estimation is carried out by employing the preamble, but the TO compensation unit 431 compensates for the TO per symbol basis. Thus, TO compensation of pilots and data of the downlink PUSC mode is represented by the following Equation 8. In this formula, k(k=0, 1, . . . , 1023) indicates a subcarrier index, $\Phi_{TO}$ indicates the linear phase of TO having a radian unit, $r_m$ indicates pilot and data of the downlink PUSC mode, $\tilde{r}_m$ indicate pilot and data with compensated TO, of the downlink PUSC mode, and l(l=0, 1, . . . , 23) indicates an OFDMA symbol index.

$$\tilde{r}_m(k,l) = r_m(k,l) \cdot e^{j \cdot (\Phi_{TO} \cdot k)} \quad \text{[Equation 8]}$$

At this time, an exponential function for the linear phase $k\Phi_{TO}$ of TO can be represented by the function form. The exponential function can be summarized into a complex form, such as a Equation 10, by employing the following Equation 9. Thus, the phase of TO on a complex plane can be compensated for through the Equation 10.

$$A(k) = \cos(k\Phi_{TO}), B(k) = \sin(k\Phi_{TO}), 0 \le k \le 1023 \quad \text{[Equation 9]}$$

$$\tilde{r}_m^{(i)}(k,l) = r_m^{(i)}(k,l) \times A(k) - r_m^{(q)}(k,l) \times B(k)$$

$$\tilde{r}_m^{(q)}(k,l) = r_m^{(i)}(k,l) \times B(k) - r_m^{(q)}(k,l) \times A(k) \quad \text{[Equation 10]}$$

Figure 17:
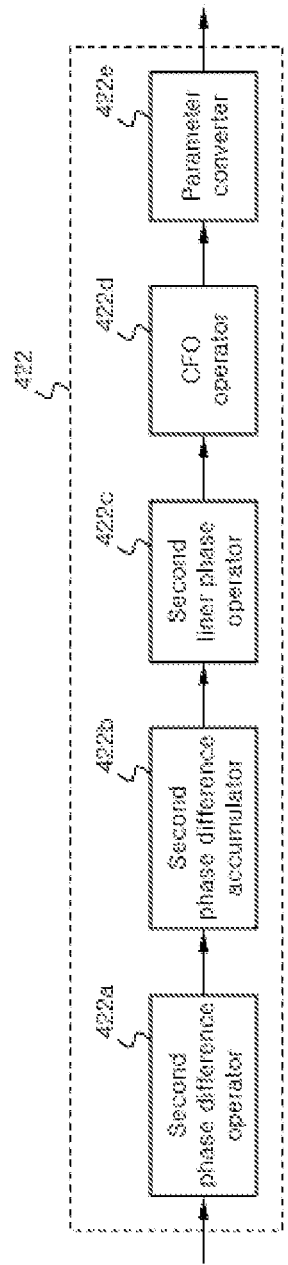
FIG. 17 is a detailed block diagram illustrating an embodiment of a CFO estimation unit of FIG. 15.

FIG. 17 is a detailed block diagram illustrating an embodiment of the CFO estimation unit of FIG. 15.

As illustrated in FIG. 17, the CFO estimation unit 422 includes a second phase difference operator 422a, a second phase difference accumulator 422b, a second liner phase operator 422c, a CFO operator 422d, and a parameter converter 422e.

The second phase difference operator 422a carries out an operation on a phase difference according to CFO by extracting two or more pilots included in at least one of the received signals of the first and second channels, which are received through the first receiving antenna, and the received signals of the third and fourth channels, which are received through the second receiving antenna.

The second phase difference accumulator 422b generates a phase difference accumulation value by accumulating respective phase differences according to the CFO, which are operated in the second phase difference operator 422a. The second phase difference accumulator 422b can estimate more accurate CFO by accumulating the phase differences operated with respect to a larger number of pilots.

The second liner phase operator 422c transforms the phase difference accumulation value, which is accumulated in the second phase difference accumulator 422b, into a linear phase $\Phi_{TO}$ according to the CFO. The linear phase $\Phi_{TO}$ for the transformed CFO indicates an average phase difference for the CFO, which occurs between neighboring symbols having the same subcarrier index (that is, subcarriers where the difference of the symbol index is 1).

The CFO operator 422d transforms the linear phase $\Phi_{CFO}$ according to the CFO, which is operated in the second liner phase operator 422c, into CFO. For example, when an OFDMA symbol period has 115.2 μs in the downlink frame, the CFO can be operated according to the following Equation 11.

$$CFO = \Phi_{CFO} \times \frac{10^7}{2\pi \cdot 1152} \quad \text{[Equation 11]}$$

The parameter converter 422e converts the CFO, which is measured in a radian unit, into an Hz (Hertz) value. The Hz value can be calculated using the following Equation 12. In this formula, "$f_{current}$" indicates the output of the CFO estimation unit 422 in the current frame of the downlink PUSC mode, "$f_{pre}$" indicates the output of the CFO estimation unit in the previous frame of the downlink PUSC mode, "Gain" is $(\zeta_f \cdot 10^7)/(2\pi \cdot 1152 \cdot 2)$, and $\zeta_f$ indicates an updated coefficient.

$$f_{current}[Hz] = (1 - \zeta_f) \cdot f_{pre} + \text{Gain} \cdot \Phi_{CFO} \quad \text{[Equation 12]}$$

A detailed example of the method of estimating CFO is described below.

First, a pilot extraction unit (not shown) extracts pilots with compensated TO in the same form as that of the Equation 1. The pilot extraction unit differs from the above pilot extraction unit in that pilots with compensated TO are extracted. Further, the second phase difference operator 422a carries out an operation on the phase difference according to the CFO by employing the pilots. The following Equation 13 is a generalized form of the phase difference and represents the accumulation result of the linear phases according to the CFO, which is operated in the second phase difference operator 422a, by employing a positional relationship between two pilots with compensated TO. In other words, the second phase difference operator 422a carries out a complex product operation on an extracted pilot pair, and the second phase difference accumulator 422b accumulates pilot pairs on which the complex product operation has been carried out. The accumulated pilot pairs can be represented by the following Equation 9. In this case, in relation to the Equation 1, $P_m(4, l, v)$ is set to $P_m(0, v)$, $P_m(8, l, v)$ is set to $P_m(1, v)$, $P_m(4, l+1, v)$ is set to $P_m(2, v)$, $P_m(8, l+1, v)$ is set to $P_m(3, v)$, $P_m(0, l+2, v)$ is set to $P_m(0, v)$, $P_m(12, l+2, v)$ is set to $P_m(1, v)$, $P_m(0, l+3, v)$ is set to $P_m(2, v)$, and $P_m(12, l+3, v)$ is set to $P_m(3, v)$. "v" indicates a cluster index, and $N_C$ indicates the number of accumulated clusters.

$$temp0^{(f)} = \quad \text{[Equation 13]}$$

$$\sum_{m=0}^{1} \sum_{v=0}^{N_C} (P_m^{(1)}(0, v) \times P_m^{(1)}(3, v) + P_m^{(q)}(0, v) \times P_m^{(q)}(3, v) +$$

$$P_m^{(1)}(1, v) \times P_m^{(1)}(2, v) + P_m^{(q)}(1, v) \times P_m^{(q)}(2, v))$$

$$temp0^{(q)} = \sum_{m=0}^{1} \sum_{v=0}^{N_C} (P_m^{(q)}(0, v) \times P_m^{(1)}(3, v) -$$

$$P_m^{(1)}(0, v) \times P_m^{(q)}(3, v) + P_m^{(q)}(1, v) \times P_m^{(1)}(2, v) -$$

$$P_m^{(1)}(1, v) \times P_m^{(q)}(2, v))$$

The liner phase operator 422c then carries out an operation on the linear phase $_{CFO}$ according to the CFO by employing the following Equation 14. That is, the liner phase operator 422c transforms the phase difference accumulation value, which is represented by the above Equation 9, into a form by using the real part as the denominator and the imaginary part as the numerator, carries out an arctan operation on the transformed fraction form, and then divides the operation results into as many as a subcarrier index difference (that is, a preamble position difference used in the phase difference operation), thus calculating the linear phase $\Phi_{CFO}$ according to the CFO.

$$\Phi_{CFO} = \tan^{-1}(\text{temp}0^{(i)}, \text{temp}0^{(q)}) \qquad \text{[Equation 14]}$$

The linear phase $\Phi_{CFO}$ according to the CFO, which is calculated as described above, is transformed into a CFO of the radian unit in the CFO operator 422d. The CFO is again transformed into an Hz value in the parameter converter 422e. The Hz value is subsequently used to compensate for error according to the CFO in the CFO compensation unit 432. For example, the CFO compensation unit 432 compensates for CFO by compensating for error of an oscillator (for example, a voltage-controlled crystal oscillator (VCXO)) based on the estimated CFO by using an Automatic Frequency Controller (AFC).

For reference, the fourth embodiment may employ a method of calculating a phase difference according to CFO by using a preamble and pilots transmitted from the same transmitting antenna, a method of calculating a phase difference according to CFO by using two pairs of pilots having the same subcarrier index difference, and so forth other than the above-mentioned CFO estimation method. A linear phase according to CFO can also be found out by employing another combination of a preamble and pilots other than the above-described methods.

The method of calculating weight values previously stored in the weight value storage unit is described in detail below with reference to FIGS. 18 and 19.

Figure 18:
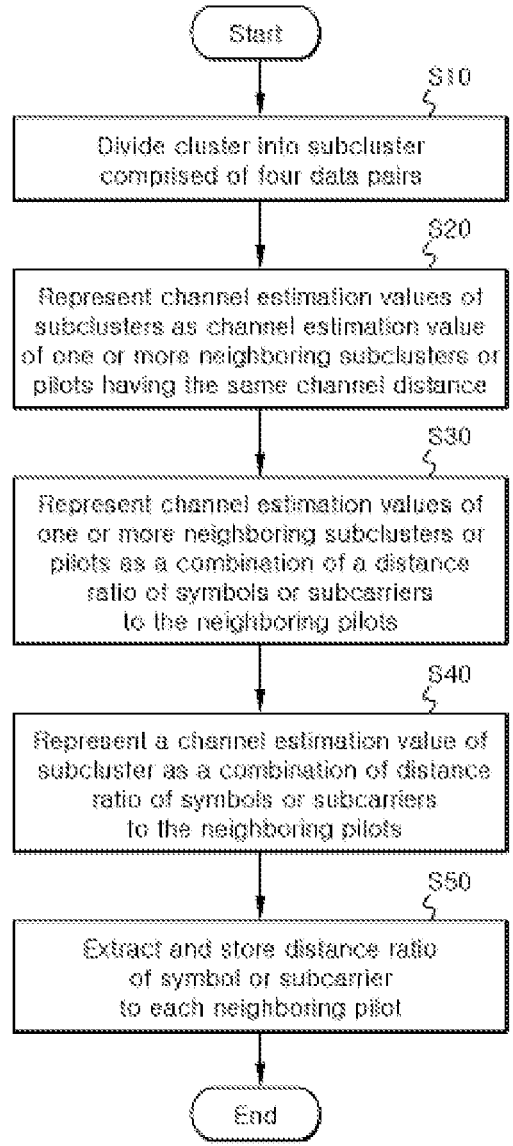
FIG. 18 is a flowchart illustrating a method of carrying out an operation on weight value in accordance with the present invention.

FIG. 18 is a flowchart illustrating a method of calculating weight values in accordance with the present invention. FIG. 19 is a view illustrating part of frame structure for illustrating the weight value calculating method of FIG. 18. In this case, 14 subcarriers and 16 symbols are taken as an example. Further, "p" indicates a pilot, "d" indicates data, subclusters indicated by a bold dotted line designate subclusters selected in order to find out a channel response, and channel responses of corresponding subclusters are indicated by "H".

Figure 19:
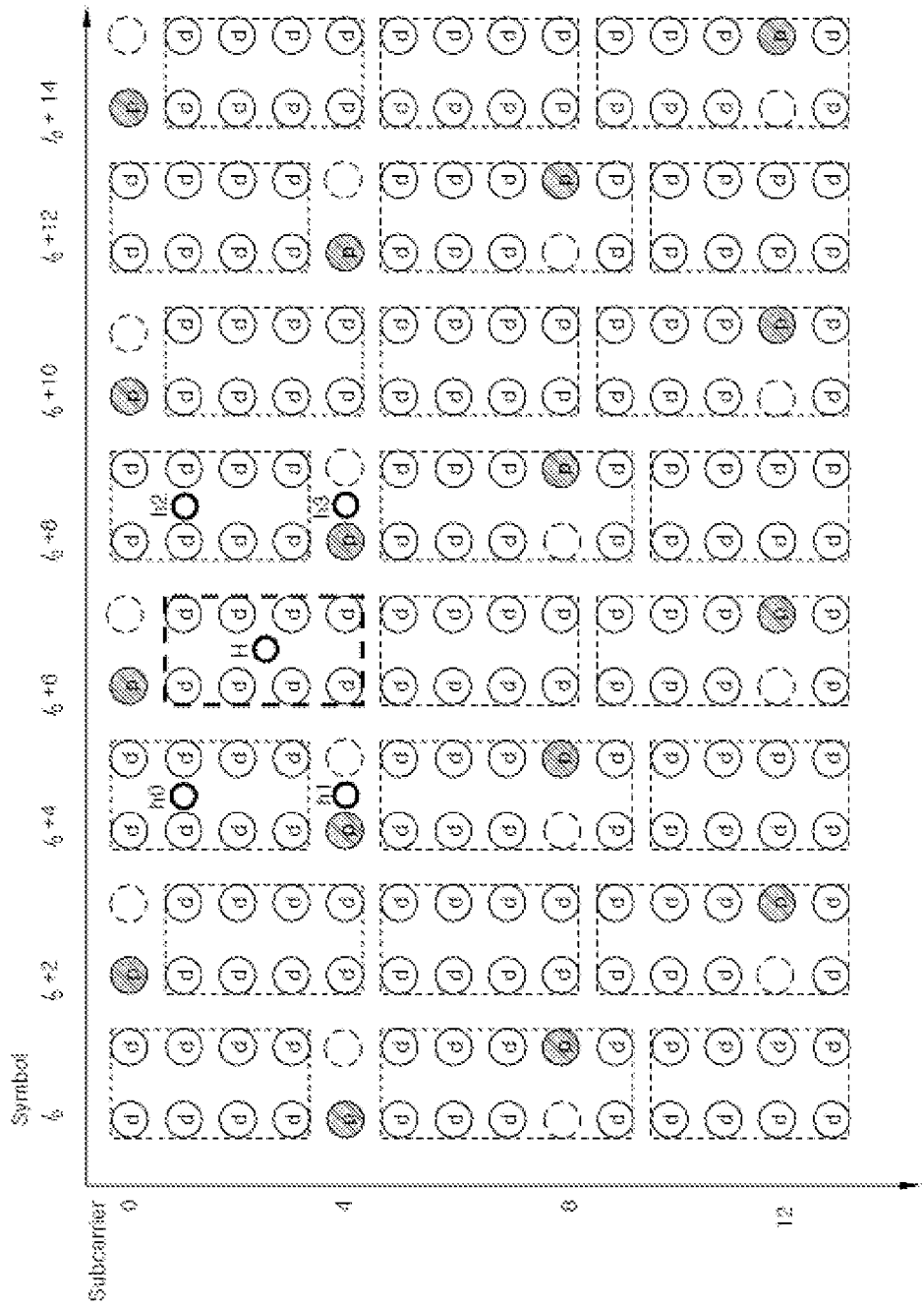
FIG. 19 is a view illustrating part of a frame structure for illustrating the weight value operation method of FIG. 18.

First, in relation to pilots comprised of the pattern as shown in the Equation 1 in the downlink PUSC mode, each of two symbols that are consecutive on the time axis and four subcarriers that are consecutive on the frequency axis is divided into subclusters, as illustrated in FIG. 19. In other words, it is assumed that each cluster is virtually divided into three subclusters in a subcarrier index direction (a subcarrier frequency axis) and one subcluster has the same channel response. It is noted that "$l_0$" in the Equation 1 indicates a symbol index at which a STC applied to the present invention begins, and the Equation 1-(2) and the Equation 1-(4) indicate the pilot patterns for the third and fourth channels.

A channel response in relation to the divided subclusters is calculated and represented as channel response with respect to one or more adjacent subclusters or pilots having the same channel distance (S10-S20). In other words, a channel response of the subclusters selected in FIG. 19 is represented by H. As "H" corresponds to the average of adjacent channels, it can be represented by H=¼(h0+h1+h2+h3).

Thereafter, the channel response of the at least one adjacent subcluster or pilot is represented by around pilots on the basis of the subclusters and a combination of a relative symbol distance ratio between the around pilots (S30). For example, assuming that a channel estimation value for a pilot is p(k, j) in FIG. 19, h0 can be repressed by employing p(0,2), p(0, 6), p(4, 4), and p(4, 8), h1 can be repressed by employing p(4, 4) and p(4, 8), h2 can be repressed by employing p(0, 6), p(0, 10), p(4, 8), and p(4, 12), and h3 can be repressed by employing p(4, 8) and p(4, 12). In this case, "k" corresponds to a symbol index, and j corresponds to a subcarrier index. Further, the term "the combination of the relative symbol distance ratio" refers to that a distance ratio for a pilot close to a subcluster is set greater than a distance ratio for a pilot far from the subcluster. If the channel estimation value of the at least one adjacent subcluster or pilot is represented by a combination of the relative symbol distance ratio as described above, h0 can be repressed by employing p(0,2), p(0, 6), p(4, 4), and p(4, 8), resulting in h0=¹⁄₁₆{1.5×3.0×p(0,2)+2.5×3.0×p(0, 6)}+3.5×p(4, 4)+0.5×p(4, 8)}. If summarizing h0, h1, h2, and h3 in this manner, h0=(1.5×3.0)/16×p(0, 2)+(2.5×3.0)/16×p(0, 6)+(3.5×1.0)/16×p(4, 4)+(0.5×1.0)/16×p(4, 8)}, h1=3.5/4×p(4, 4)+0.5/4×p(4, 8), h2=(1.5×3.0)/16×p(0, 6)+(2.5×3.0)/16×p(0, 10)+(3.5×1.0)/16×p(4, 8)+(0.5×1.0)/16×p(4, 12), and h3=3.5/4×p(4, 8)+0.5/4×p(4, 12) can be obtained.

Thereafter, the channel response of the subcluster is represented as a combination of around pilots on the basis of the subcluster and a relative symbol distance ratio of the around pilots (S40). For example, since H=¼(h0+h1+h2+h3) in FIG. 19, H=¼{(1.5×3.0)/16}×p(0, 2)+¼{(2.5×3.0)/16+(1.5×3.0)/16}×p(0, 6)+¼{(3.5×1.0)/16+3.5/4}×p(4, 4)+¼{(0.5×1.0)/16+0.5/4+(3.5×1.0)/16+3.5/4}×p(4, 8)+¼{(0.5×1.0)/16+0.5/4}×p(4, 12)+¼{(2.5×3.0)/16}×p(0, 10). In this case, if the multiplied ratio (that is, weight value) is set to w0, p(0, 6) is set to w1, p(4, 4) is set to w2, p(4, 8) is set to w3, p(4, 12) is set to w4, and p(0, 10) is set to w5 before p(0, 2), H is represented as a combination of around pilots and a relative symbol distance ratio of the around pilots, such as H=w0×h0+w1×h1+w2×h2+w3×h3+w4×h4+w5×h5.

Finally, the relative symbol distance ratio for each around pilot is calculated and a coefficient for each pilot is stored in the weight value storage unit (S50). For example, in FIG. 19, w0=¼{(1.5×3.0)/16}=0.0703, w1=¼{(2.5×3.0)/16+(3.5×1.0)/16}=0.1719, w2=¼{(3.5×1.0)/16+3.5/4}=0.2734, w3=¼{(0.5×1.0)/16+0.5/4+(3.5×1.0)/16+3.5/4}=0.3125, w4=¼{(0.5×1.0)/16+0.5/4}=0.0391, and w5=¼{(2.5×3.0)/16}=0.1172. Accordingly, the thus stored relative symbol distance ratios w0 to w5 for respective around pilots are stored in the weight value storage unit, so the channel estimation unit 440 can make a reference for the relative symbol distance ratios upon channel estimation.

In the present embodiment, the six pilots are used to represent the channel response H of one subcluster. It is, however, evident that a plurality of pilots may be used to represent the channel response H of one subcluster in the same manner. For example, four adjacent pilots may be used to represent the channel response H of one subcluster as follows. That is, if it is sought to represent the channel response H of the subcluster illustrated in FIG. 19 by using adjacent pilots (for example, p(0, 6), p(4, 4), p(4, 8), and p(0, 10)), it results in H=⅛{3.5×p(0, 6)+0.5×p(0, 10)+1.5×p(4, 4)+2.5×p(0.6)}. In the relative symbol distance ratio for each pilot, a coefficient for p(0, 6) can be represented as 0.4375, a coefficient for p(0, 10) can be represented as 0.0625, a coefficient for p(4, 4) can be represented as 0.1875, and a coefficient for p(4, 8) can be represented as 0.3125.

As an alternative embodiment, in the same manner as the above method, each cluster can be divided into subcluster units, a weight value can be calculated with respect to the pilots of the subcluster on the basis of at least one of interpolation on the time axis, interpolation on the frequency axis, and a moving average, and then stored in the weight value storage unit 450.

If it is summarized using the method described so far, weight values for the entire channels can be found out as listed in the following Tables 2 to 8.

The following Tables 2 and 3 are the results of summarizing channel weights for respective pilots in the symbols located at the ends of the right and left sides. In more detail, in Tables 2 and 3, respective subcluster-based weight values are summarized with respect to the ends on the left and right sides of the frame ($l_0+5>l, l>l_e-5$) in the frame received through the second channel H01 or the fourth channel H11 (the downlink frame comprises 27 symbols, wherein one symbol is used for a preamble and two symbols are used for FCH, so 24 data symbols are used). A channel weight value for each pilot is calculated and stored in the weight value storage unit 450. At this time, "$l_0$" indicates the start symbol index and "$l_e$" indicates the last symbol index.

In Table 2, in relation to a channel estimation value P(y, x) for a pilot, y(y=0,1) indicates a pilot index and x(x=0, 1, . . . , 11) indicates a slot symbol (since a channel is estimated in two symbol units in the downlink PUSC mode, the two symbol units are referred to as the slot symbol). In this case, the pilot index is set to 0 when a corresponding pilot is placed at a 6 or higher and is set to 1 when a corresponding pilot is placed at a 6 or lower on the basis of a total of 14 subcarriers on the frequency axis.

TABLE 2

Channel (H01 or H11) weight value (boundary symbol)

| | symbol $l_0$ | weight | symbol $l_0$ + 2 | weight | symbol $l_0$ + 4 | weight |
|---|---|---|---|---|---|---|
| Subcluster 1 | $P_m(1, x+1)$ | 0.5313 | $P_m(1, x)$ | 0.2906 | $P_m(1, x+3)$ | 0.0156 |
| | $P_m(1, x)$ | 0.1875 | $P_m(1, x+2)$ | 0.0844 | $P_m(1, x-2)$ | 0.0375 |
| | $P_m(1, x+2)$ | 0.1875 | $P_m(1, x-2)$ | 0.25 | $P_m(1, x+2)$ | 0.0844 |
| | $P_m(1, x+3)$ | 0.0938 | $P_m(1, x+1)$ | 0.3594 | $P_m(1, x-1)$ | 0.25 |
| | | | $P_m(1, x+3)$ | 0.0196 | $P_m(1, x)$ | 0.2531 |
| | | | | | $P_m(1, x+1)$ | 0.3594 |
| Subcluster 2 | $P_m(1, x)$ | 0.1875 | $P_m(1, x+3)$ | 0.0094 | $P_m(1, x-2)$ | 0.0375 |
| | $P_m(1, x+2)$ | 0.1875 | $P_m(1, x-1)$ | 0.15 | $P_m(0, x+2)$ | 0.0625 |
| | $P_m(0, x)$ | 0.3937 | $P_m(1, x+1)$ | 0.2156 | $P_m(1, x+2)$ | 0.0844 |
| | $P_m(0, x) + 2$ | 0.1688 | $P_m(0, x+1)$ | 0.25 | $P_m(0, x-2)$ | 0.1406 |
| | $P_m(0, x+1)$ | 0.0563 | $P_m(0, x-1)$ | 0.375 | $P_m(1, x)$ | 0.2531 |
| | $P_m(0, x+3)$ | 0.0031 | | | $P_m(0, x)$ | 0.3164 |
| | | | | | $P_m(0, x-1)$ | 0.0527 |
| | | | | | $P_m(0, x+1)$ | 0.0527 |
| Subcluster 3 | $P_m(0, x)$ | 0.1313 | $P_m(0, x-1)$ | 0.225 | $P_m(0, x-2)$ | 0.0586 |
| | $P_m(0, x+1)$ | 0.7719 | $P_m(0, x)$ | 0.5625 | $P_m(0, x)$ | 0.0938 |
| | $P_m(0, x+2)$ | 0.0563 | $P_m(0, x+1)$ | 0.15 | $P_m(0, x-1)$ | 0.457 |
| | $P_m(0, x+3)$ | 0.0406 | $P_m(0, x+2)$ | 0.0625 | $P_m(0, x+2)$ | 0.0352 |
| | | | | | $P_m(0, x+1)$ | 0.3555 |

Meanwhile, in the following Table 3, mod($l-l_0$, 4)=0 refers to a case where a symbol allocated to l corresponds to a multiple of 4 at the initial $l_0$, and mod($l-l_0$, 4)~=0 refers to a case where/corresponds to a multiple of 4 at the initial $l_0$.

TABLE 3

Channel (H01 or H11) weight value (boundary symbol)

| | symbol $l_e$ – 3 | weight | symbol $l_e$ | weight | symbol $l_e$ – 5 | weight |
|---|---|---|---|---|---|---|
| | | | Case1: mod(1 – $l_0$, 4) == 0 | | | |
| Subcluster 1 | $P_m(1, x-2)$ | 0.0375 | $P_m(1, x)$ | 0.2625 | $P_m(1, x-2)$ | 0.0375 |
| | $P_m(1, x-1)$ | 0.25 | $P_m(1, x-1)$ | 0.5936 | $P_m(1, x+2)$ | 0.0844 |
| | $P_m(1, x)$ | 0.3375 | $P_m(1, x-2)$ | 0.1125 | $P_m(1, x-1)$ | 0.25 |
| | $P_m(1, x+1)$ | 0.375 | $P_m(1, x-3)$ | 0.0313 | $P_m(1, x)$ | 0.2531 |
| | | | | | $P_m(1, x+1)$ | 0.375 |
| Subcluster 2 | $P_m(1, x-2)$ | 0.0375 | $P_m(1, x-1)$ | 0.3563 | $P_m(1, x-3)$ | 0.0156 |
| | $P_m(0, 2-2)$ | 0.1406 | $P_m(0, x-1)$ | 0.5313 | $P_m(1, x-1)$ | 0.15 |
| | $P_m(1, x)$ | 0.3375 | $P_m(1, x-3)$ | 0.0187 | $P_m(1, x+1)$ | 0.225 |
| | $P_m(0, x)$ | 0.375 | $P_m(0, x-3)$ | 0.938 | $P_m(0, x+1)$ | 0.25 |
| | $P_m(0, x-1)$ | 0.0606 | | | $P_m(0, x-1)$ | 0.3594 |
| | $P_m(0, x+1)$ | 0.0606 | | | | |
| Subcluster 3 | $P_m(0, x-2)$ | 0.0586 | $P_m(0, x)$ | 0.3125 | $P_m(0, x-3)$ | 0.0094 |
| | $P_m(0, x)$ | 0.1289 | $P_m(0, x-1)$ | 0.3187 | $P_m(0, x+2)$ | 0.0625 |
| | $P_m(0, x-1)$ | 0.4063 | $P_m(0, x-2)$ | 0.3125 | $P_m(0, x-2)$ | 0.1406 |
| | $P_m(0, x-3)$ | 0.508 | $P_m(0, x-3)$ | 0.0563 | $P_m(0, x+1)$ | 0.15 |
| | $P_m(0, x+1)$ | 0.3555 | | | $P_m(0, x-1)$ | 0.2156 |
| | | | | | $P_m(0, x)$ | 0.4219 |

TABLE 3-continued

Channel (H01 or H11) weight value (boundary symbol)

| | symbol $l_e - 3$ | weight | symbol $l_e$ | weight | symbol $l_e - 5$ | weight |
|---|---|---|---|---|---|---|
| | | | Case2: mod(1 − $l_0$, 4) == 0 | | | |
| Subcluster 1 | $P_m(1, x)$ | 0.03531 | $P_m(1, x - 3)$ | 0.0313 | $P_m(1, x)$ | 0.0156 |
| | $P_m(1, x - 2)$ | 0.0375 | $P_m(1, x - 2)$ | 0.1125 | $P_m(1, x - 2)$ | 0.0375 |
| | $P_m(1, x + 1)$ | 0.3594 | $P_m(1, x - 1)$ | 0.5938 | $P_m(1, x + 2)$ | 0.0844 |
| | $P_m(1, x - 1)$ | 0.25 | $P_m(1, x)$ | 0.2625 | $P_m(1, x - 1)$ | 0.25 |
| | | | | | $P_m(1, x)$ | 0.2531 |
| | | | | | $P_m(1, x + 1)$ | 0.3954 |
| Subcluster 2 | $P_m(1, x)$ | 0.0094 | $P_m(1, x - 2)$ | 0.1125 | $P_m(1, x - 2)$ | 0.0375 |
| | $P_m(1, x - 3)$ | 0.0156 | $P_m(0, x - 2)$ | 0.2813 | $P_m(0, x + 2)$ | 0.0625 |
| | $P_m(1, x - 1)$ | 0.15 | $P_m(1, x)$ | 0.2625 | $P_m(1, x + 2)$ | 0.0844 |
| | $P_m(1, x + 1)$ | 0.2156 | $P_m(0, x)$ | 0.2813 | $P_m(0, x - 2)$ | 0.1406 |
| | $P_m(0, x + 1)$ | 0.25 | $P_m(0, x - 1)$ | 0.0094 | $P_m(0, x)$ | 0.3164 |
| | | | | | $P_m(0, x - 1)$ | 0.0527 |
| | | | | | $P_m(0, x + 1)$ | 0.0527 |
| Subcluster 3 | $P_m(0, x - 3)$ | 0.0094 | $P_m(0, x - 2)$ | 0.938 | $P_m(0, x - 2)$ | 0.0586 |
| | $P_m(0, x)$ | 0.0625 | $P_m(0, x - 1)$ | 0.6906 | $P_m(0, x - 3)$ | 0.0508 |
| | $P_m(0, x - 2)$ | 0.1406 | $P_m(0, x)$ | 0.0938 | $P_m(0, x)$ | 0.0938 |
| | $P_m(0, x + 1)$ | 0.15 | $P_m(0, x - 3)$ | 0.1219 | $P_m(0, x - 1)$ | 0.4063 |
| | $P_m(0, x - 1)$ | 0.2156 | | | $P_m(0, x + 2)$ | 0.0352 |
| | $P_m(0, x)$ | 0.4219 | | | $P_m(0, x + 1)$ | 0.3555 |

On the other hand, the following Table 4 illustrates the arrangement of each subcluster-based weight value in a frame, received through the second channel H01 or the fourth channel H11, with respect to a central portion ($l_0+5<l<l_e-5$) of the frame. A channel weight for each pilot is calculated and stored in the weight value storage unit 450.

TABLE 4

Channel (H01 or H11) weight value
Where $l_0 + 5 < l < l_e - 5$, $l_e$ corresponds to the end of a Subframe.

| | when Mod(x,2) ==0, symbol l | weight | when Mod(x, 2) == 1, symbol l | weight |
|---|---|---|---|---|
| Subcluster 1 | $P_m(1, x + 3)$ | 0.0156 | $P_m(1, x + 3)$ | 0.0156 |
| | $P_m(1, x - 2)$ | 0.0375 | $P_m(1, x - 2)$ | 0.0375 |
| | $P_m(1, x + 2)$ | 0.0844 | $P_m(1, x + 2)$ | 0.0844 |
| | $P_m(1, x - 1)$ | 0.25 | $P_m(1, x - 1)$ | 0.25 |
| | $P_m(1, x)$ | 0.2531 | $P_m(1, x)$ | 0.2531 |
| | $P_m(1, x + 1)$ | 0.3954 | $P_m(1, x + 1)$ | 0.3594 |
| Subcluster 2 | $P_m(1, x + 3)$ | 0.0094 | $P_m(1, x - 2)$ | 0.0375 |
| | $P_m(1, x - 3)$ | 0.0156 | $P_m(0, x + 2)$ | 0.0625 |
| | $P_m(1, x - 1)$ | 0.15 | $P_m(1, x + 2)$ | 0.0844 |
| | $P_m(1, x + 1)$ | 0.2156 | $P_m(0, x - 2)$ | 0.1406 |
| | $P_m(0, x + 1)$ | 0.25 | $P_m(1, x)$ | 0.2531 |
| | $P_m(0, x - 1)$ | 0.3594 | $P_m(0, x)$ | 0.3164 |
| | | | $P_m(0, x - 1)$ | 0.0527 |
| | | | $P_m(0, x + 1)$ | 0.0527 |
| Subcluster 3 | $P_m(0, x - 3)$ | 0.0094 | $P_m(0, x - 2)$ | 0.0566 |
| | $P_m(0, x + 2)$ | 0.0625 | $P_m(0, x - 3)$ | 0.0508 |
| | $P_m(0, x - 2)$ | 0.1406 | $P_m(0, x)$ | 0.0938 |
| | $P_m(0, x + 1)$ | 0.15 | $P_m(0, x - 1)$ | 0.4063 |
| | $P_m(0, x - 1)$ | 0.2156 | $P_m(0, x + 2)$ | 0.0352 |
| | $P_m(0, x)$ | 0.4219 | $P_m(0, x + 1)$ | 0.0355 |

The following Tables 5 to 7 illustrates the arrangement of each subcluster-based weight value, which is found from the frame received through the first channel H00 or the third channel H10. A channel weight value for each pilot is calculated and stored in the weight value storage unit 450. In addition, Tables 5 to 7 are similar to those described in the above Tables 2 to 4, and detailed description thereof will be omitted.

TABLE 5

Channel (H00 or H10) weight value
where $l_0 + 5 < l < l_e - 5$, $l_e$ corresponds to the end of a Subframe.

| | when Mod(x, 2) == 0, symbol l | weight | weight Mod(x, 2) == 1, symbol l | weight |
|---|---|---|---|---|
| Subcluster 1 | $P_m(1, x - 3)$ | 0.0156 | $P_m(1, x - 3)$ | 0.0156 |
| | $P_m(1, x + 2)$ | 0.0375 | $P_m(1, x + 2)$ | 0.0375 |
| | $P_m(1, x - 2)$ | 0.0844 | $P_m(1, x - 2)$ | 0.0844 |
| | $P_m(1, x + 1)$ | 0.25 | $P_m(1, x + 1)$ | 0.25 |
| | $P_m(1, x)$ | 0.2531 | $P_m(1, x + 1)$ | 0.2531 |
| | $P_m(1, x - 1)$ | 0.3594 | $P_m(1, x - 1)$ | 0.3594 |
| Subcluster 2 | $P_m(1, x - 3)$ | 0.0094 | $P_m(1, x + 2)$ | 0.0375 |
| | $P_m(0, x + 3)$ | 0.0156 | $P_m(0, x - 2)$ | 0.0625 |
| | $P_m(1, x + 1)$ | 0.15 | $P_m(1, x - 2)$ | 0.0844 |
| | $P_m(1, x - 1)$ | 0.2156 | $P_m(0, x + 2)$ | 0.1406 |
| | $P_m(0, x - 1)$ | 0.25 | $P_m(1, x)$ | 0.2531 |
| | $P_m(0, x + 1)$ | 0.3594 | $P_m(0, x)$ | 0.3164 |
| | | | $P_m(0, x - 1)$ | 0.0527 |
| | | | $P_m(0, x + 1)$ | 0.0527 |
| Subcluster 3 | $P_m(0, x + 3)$ | 0.0094 | $P_m(0, x - 2)$ | 0.0352 |
| | $P_m(0, x - 2)$ | 0.0625 | $P_m(0, x)$ | 0.0938 |
| | $P_m(0, x + 2)$ | 0.1406 | $P_m(0, x - 1)$ | 0.3555 |
| | $P_m(0, x - 1)$ | 0.15 | $P_m(0, x + 1)$ | 0.4063 |
| | $P_m(0, x + 1)$ | 0.2156 | $P_m(0, x + 2)$ | 0.0586 |
| | $P_m(0, x)$ | 0.4219 | $P_m(0, x + 3)$ | 0.0508 |

TABLE 6

Channel (H00 or H10) weight value (boundary symbol)

| | symbol $l_0$ | weight | symbol $l_0 + 2$ | weight | symbol $l_0 + 4$ | weight |
|---|---|---|---|---|---|---|
| Subcluster 1 | $P_m(1, x + 1)$ | 0.5938 | $P_m(1, x + 2)$ | 0.0375 | $P_m(1, x + 2)$ | 0.0375 |
| | $P_m(1, x)$ | 0.2625 | $P_m(1, x + 1)$ | 0.25 | $P_m(1, x - 2)$ | 0.0844 |

TABLE 6-continued

Channel (H00 or H10) weight value (boundary symbol)

| | symbol $l_0$ | weight | symbol $l_0 + 2$ | weight | symbol $l_0 + 4$ | weight |
|---|---|---|---|---|---|---|
| | $P_m(1, x+2)$ | 0.1125 | $P_m(1, x)$ | 0.3375 | $P_m(1, x+1)$ | 0.25 |
| | $P_m(1, x+3)$ | 0.0313 | $P_m(1, x-1)$ | 0.375 | $P_m(1, x)$ | 0.2531 |
| | | | | | $P_m(1, x-1)$ | 0.375 |
| Subcluster 2 | $P_m(1, x)$ | 0.2625 | $P_m(0, x+3)$ | 0.0156 | $P_m(1, x+2)$ | 0.0375 |
| | $P_m(1, x+2)$ | 0.1125 | $P_m(1, x+1)$ | 0.15 | $P_m(0, x-2)$ | 0.0625 |
| | $P_m(0, x)$ | 0.2813 | $P_m(1, x-1)$ | 0.225 | $P_m(1, x-2)$ | 0.0844 |
| | $P_m(0, x+2)$ | 0.2813 | $P_m(0, x-1)$ | 0.25 | $P_m(0, x+2)$ | 0.1406 |
| | $P_m(0, x+1)$ | 0.0531 | $P_m(0, x+1)$ | 0.3594 | $P_m(1, x)$ | 0.2531 |
| | $P_m(0, x+3)$ | 0.0094 | | | $P_m(0, x)$ | 0.3164 |
| | | | | | $P_m(0, x-1)$ | 0.0527 |
| | | | | | $P_m(0, x+1)$ | 0.0527 |
| Subcluster 3 | $P_m(0, x)$ | 0.0938 | $P_m(0, x+3)$ | 0.0094 | $P_m(0, x-2)$ | 0.0352 |
| | $P_m(0, x+1)$ | 0.6906 | $P_m(0, x+2)$ | 0.1406 | $P_m(0, x)$ | 0.0938 |
| | $P_m(0, x+2)$ | 0.0938 | $P_m(0, x-1)$ | 0.15 | $P_m(0, x-1)$ | 0.3555 |
| | $P_m(0, x+3)$ | 0.1219 | $P_m(0, x+1)$ | 0.2156 | $P_m(0, x+1)$ | 0.4063 |
| | | | $P_m(0, x)$ | 0.4844 | $P_m(0, x+2)$ | 0.0586 |
| | | | | | $P_m(0, x+3)$ | |

TABLE 7

Channel (H00 or H10) weight value (boundary symbol)

| | symbol $l_e - 3$ | weight | symbol $l_e$ | weight | symbol $l_e - 5$ | weight |
|---|---|---|---|---|---|---|
| | | | Case 1: mod($1 - l_0$, 4) == 0 | | | |
| Subcluster 1 | $P_m(1, x-3)$ | 0.0156 | $P_m(1, x)$ | 0.1875 | $P_m(1, x-3)$ | 0.0156 |
| | $P_m(1, x-2)$ | 0.0844 | $P_m(1, x-1)$ | 0.5313 | $P_m(1, x+2)$ | 0.0375 |
| | $P_m(1, x-1)$ | 0.3594 | $P_m(1, x-2)$ | 0.1875 | $P_m(1, x-2)$ | 0.0844 |
| | $P_m(1, x)$ | 0.2906 | $P_m(1, x-3)$ | 0.0938 | $P_m(1, x+1)$ | 0.25 |
| | $P_m(1, x+1)$ | 0.25 | | | $P_m(1, x)$ | 0.2531 |
| | | | | | $P_m(1, x-1)$ | 0.3594 |
| Subcluster 2 | $P_m(0, x-2)$ | 0.0625 | $P_m(1, x-1)$ | 0.3187 | $P_m(1, x-3)$ | 0.0094 |
| | $P_m(1, x-2)$ | 0.0844 | $P_m(0, x-1)$ | 0.5938 | $P_m(1, x+1)$ | 0.15 |
| | $P_m(1, x)$ | 0.2906 | $P_m(1, x-3)$ | 0.0563 | $P_m(1, x-1)$ | 0.2156 |
| | $P_m(0, x)$ | 0.4219 | $P_m(0, x-3)$ | 0.0313 | $P_m(0, x-1)$ | 0.25 |
| | $P_m(0, x-1)$ | 0.0703 | | | $P_m(0, x+1)$ | 0.375 |
| | $P_m(0, x+1)$ | 0.0703 | | | | |
| Subcluster 3 | $P_m(0, x-2)$ | 0.0125 | $P_m(0, x)$ | 0.4375 | $P_m(0, x-2)$ | 0.0625 |
| | $P_m(0, x)$ | 0.1125 | $P_m(0, x-1)$ | 0.3563 | $P_m(0, x+2)$ | 0.1406 |
| | $P_m(0, x-1)$ | 0.35 | $P_m(0, x-2)$ | 0.1875 | $P_m(0, x-1)$ | 0.15 |
| | $P_m(0, x+1)$ | 0.525 | $P_m(0, x-3)$ | 0.0187 | $P_m(0, x+1)$ | 0.225 |
| | | | | | $P_m(0, x)$ | 0.4219 |
| | | | Case 2: mod($1 - l_0$, 4) == 0 | | | |
| Subcluster 1 | $P_m(1, x-3)$ | 0.0156 | $P_m(1, x-3)$ | 0.0938 | $P_m(1, x-3)$ | 0.0156 |
| | $P_m(1, x-2)$ | 0.0844 | $P_m(1, x-2)$ | 0.1875 | $P_m(1, x+2)$ | 0.0375 |
| | $P_m(1, x+1)$ | 0.25 | $P_m(1, x-1)$ | 0.5313 | $P_m(1, x-2)$ | 0.0844 |
| | $P_m(1, x-1)$ | 0.3594 | $P_m(1, x)$ | 0.1875 | $P_m(1, x+1)$ | 0.25 |
| | $P_m(1, x)$ | 0.2906 | | | $P_m(1, x)$ | 0.2531 |
| | | | | | $P_m(1, x-1)$ | 0.3594 |
| Subcluster 2 | $P_m(1, x-3)$ | 0.0094 | $P_m(1, x-2)$ | 0.1875 | $P_m(1, x+2)$ | 0.0375 |
| | $P_m(1, x+1)$ | 0.15 | $P_m(0, x-2)$ | 0.1688 | $P_m(0, x-2)$ | 0.0625 |
| | $P_m(1, x-1)$ | 0.2156 | $P_m(1, x)$ | 0.1875 | $P_m(1, x-2)$ | 0.0844 |
| | $P_m(0, x-1)$ | 0.25 | $P_m(0, x)$ | 0.3937 | $P_m(0, x+2)$ | 0.1406 |
| | $P_m(0, x+1)$ | 0.375 | $P_m(0, x-1)$ | 0.0594 | $P_m(1, x)$ | 0.2531 |
| | | | $P_m(0, x-3)$ | 0.0031 | $P_m(0, x)$ | 0.3164 |
| | | | | | $P_m(0, x-1)$ | 0.0527 |
| | | | | | $P_m(0, x+1)$ | 0.0527 |
| Subcluster 3 | $P_m(0, x-2)$ | 0.0625 | $P_m(0, x-2)$ | 0.0563 | $P_m(0, x-2)$ | 0.0352 |
| | $P_m(0, x)$ | 0.5625 | $P_m(0, x-1)$ | 0.7719 | $P_m(0, x)$ | 0.0938 |
| | $P_m(0, x-1)$ | 0.15 | $P_m(0, x)$ | 0.1313 | $P_m(0, x+1)$ | 0.3555 |
| | $P_m(0, x+1)$ | 0.225 | $P_m(0, x-3)$ | 0.0406 | $P_m(0, x+1)$ | 0.457 |
| | | | | | $P_m(0, x+2)$ | 0.0586 |

Referring back to FIG. 15, the channel estimation unit 440 extracts pilots whose TO has been compensated with respect to the received signal according to the Equation 1, and finds out a channel estimation value by carrying out an operation on each subcluster-based channel response based on the following Equation 15 with reference to weight values as illustrated in Tables 2 to 7, which are previously calculated off-line and stored in the weight value storage unit 450. In this case, u(u=0, 1, 2) indicates a subcluster index, v(v=0, 1, . . . , 59) indicates a cluster index, x(x=0, 1, . . . , 11) indicate a slot symbol index as described above, and y(y=0, 1) indicate a pilot index.

$$h_{m,n}(u,v,x)=w1(u,v,x) \times P1(y,v,x)+w2(u,v,x) \times P2(y,v,x)+ \\ w3(u,v,x) \times P3(y,v,x)+w4(u,v,x) \times P4(y,v,x)+w5(u,v,x) \times P5(y,v,x)+w6(u,v,x) \times P6(y,v,x)$$ [Equation 15]

For example, in the case of the subcluster 1 of Table 2, channel response of the subcluster 1 with respect to the symbol/is calculated as in the following Equation 16.

$$H_{m,n}(u,v,x)=w1 \times P1+w2 \times P2+w3 \times P3+w4 \times P=0.5313 \times \\ P_m(1,x+1)+0.1875 \times P_m(1,x)+0.1875 \times P_m(1,x+2)+ \\ 0.1875 \times P_m(1,x+3)$$ [Equation 16]

For example, when the pilot $P_{00}$ corresponds to {1.4903+ 0.6939i, 1.4674+0.7532i, 1.52+0.6329i 1.4585+0.6959i} and the weight value $W_{00}$ corresponds to {0.5313, 0.1875, 0.1875, 0.0938}, the channel response $H_{00}$ is (1.4903+ 0.6939i)×0.5313+(1.4674+0.7532i)×0.1875+(1.52+ 0.6329i)×0.1875+(1.4585+0.6959i)×0.0938, and thus finally corresponds to the channel response $H_{00}$ 1.4887+0.6938i of the subcluster 1 with respect to the symbol l.

Meanwhile, although only the first channel estimation unit 410 for estimating the first channel H00 and the second channel H01 concerned with the first receiving antenna has been described, the third channel H10 and the fourth channel H11 related to the second receiving antenna can be estimated through the second channel estimation unit 420 in a similar method to the method.

Figure 20:
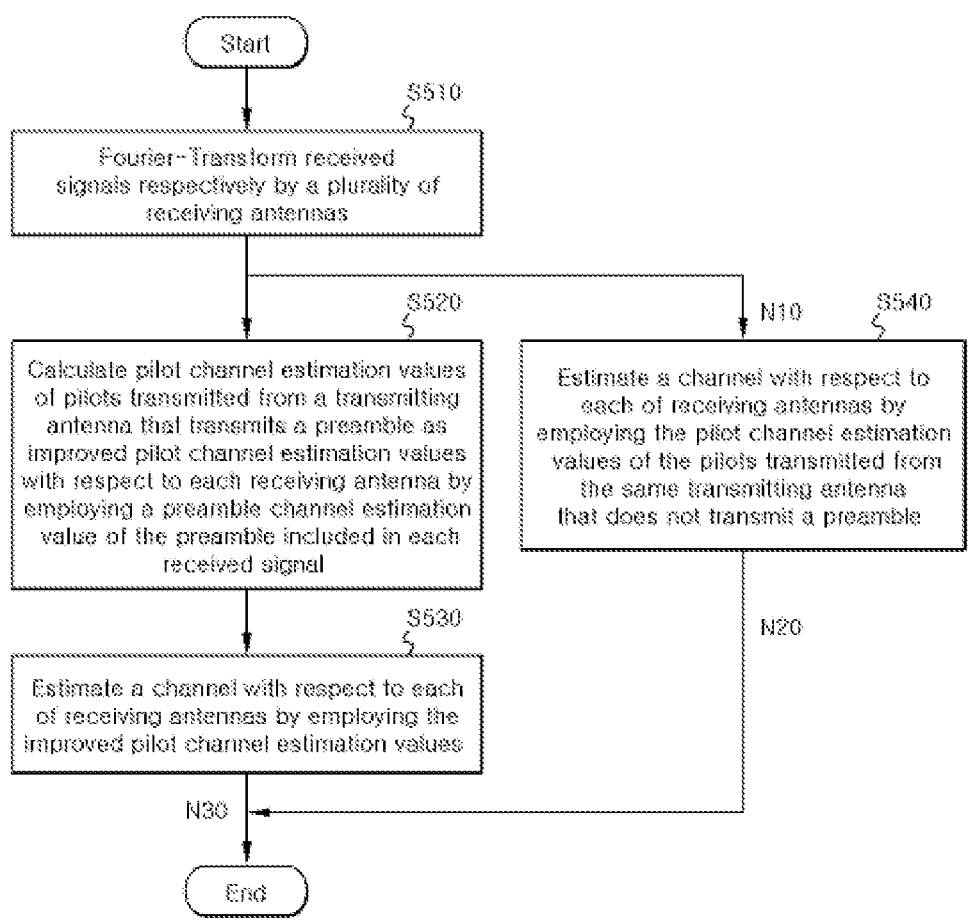
FIG. 20 is an operational flowchart with respect to a channel estimation method according to a first embodiment of the present invention.

FIG. 20 is an operational flowchart with respect to a channel estimation method according to a first embodiment of the present invention. For reference, the channel estimation method according to the first embodiment is related to the channel estimation apparatus according to the first embodiment.

Referring to FIG. 20, in the channel estimation method in accordance with the present invention, received signals received through the plurality of receiving antennas, respectively, are Fourier-transformed through FFT (S510). That is, the received signals of the baseband are transformed into signals of a frequency band.

Pilot channel estimation values of pilots, which are transmitted from the transmitting antenna that transmits a preamble using a preamble channel estimation value based on a preamble included in each Fourier-transformed and received signal, are calculated as improved pilot channel estimation values with respect to each of the receiving antennas (S520).

In this case, only when a frequency where a subcarrier of the preamble channel estimation value is located is identical to a frequency where the pilot channel estimation values are located, operation between the preamble channel estimation value and the pilot channel estimation values is carried out.

If the pilot channel estimation values of the pilots transmitted from the first transmitting antenna are calculated in the respective receiving antennas based on the preamble channel estimation value, the pilot channel estimation value is transformed into the improved pilot channel estimation values.

The pilot channel estimation value improved by the preamble channel estimation value can be represented by the above Equations 2 and 3.

If the operation process of the pilot channel estimation values employing the preamble channel estimation value is performed, the channels H00 and H10, that is, the channels for the respective receiving antennas are estimated by employing the improved pilot channel estimation value for the respective receiving antennas (S530). In this case, the channel can be estimated through interpolation of the symbol axis and the frequency axis employing the improved pilot channel estimation value.

An estimation step S540 with respect to the channels H01 and H11 to which the preamble with respect to each of the receiving antennas has not been sent is executed simultaneously with step S520. That is, a channel with respect to each of the receiving antennas is estimated by employing the pilot channel estimation values of the pilots transmitted from the same transmitting antenna, of the pilots transmitted through the channels H01 and H11 (S540).

In this case, the channel can be estimated through interpolation of the symbol axis and the frequency axis employing the pilot channel estimation values of the pilots transmitted from the same transmitting antenna.

It has been illustrated that in FIG. 20, step S520 and step S540 are performed at the same time. However, this is only an example, and step S540 may be performed anterior to step S520 or step S540 may be performed posterior to step S530.

Figure 21:
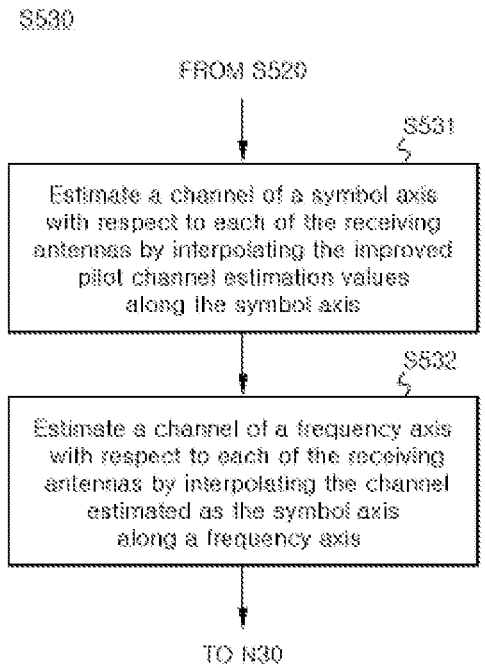
FIG. 21 is a detailed operational flowchart with respect to step S530 illustrated in FIG. 20.

FIG. 21 is a detailed operational flowchart with respect to step S530 illustrated in FIG. 20.

Referring to FIG. 21, in the step of estimating the channel with respect to each of the receiving antennas using the improved pilot channel estimation value, a channel of a symbol axis with respect to each of the receiving antennas is estimated by interpolating the improved pilot channel estimation value along a symbol axis according to the Equations 2 and 3 (S531).

In this case, in the symbol axis, in the case of a channel not located between the improved pilot channel estimation values, a pilot channel estimation value of the improved pilot channel estimation values, which is located at the nearest symbol index, can be copied to a channel not located between the improved pilot channel estimation values.

In this case, in the symbol axis, in the case of a channel located between a pilot channel estimation value having the smallest symbol index, of the improved pilot channel estimation values, and a preamble channel estimation value, the channel located between the pilot channel estimation value having the smallest symbol index and the preamble channel estimation value can be estimated through interpolation of the improved pilot channel estimation value having the smallest symbol index and the preamble channel estimation value.

If the channel of the symbol axis is estimated, the channel of the frequency axis with respect to each of the receiving antennas is estimated by interpolating the channel estimated as the symbol axis as the frequency axis (S532).

In this case, in the case of a channel not located between channels estimated as the symbol axis, the nearest channel of the channels estimated as the symbol axis can be copied to the channel not located between the estimated channels.

Figure 22:
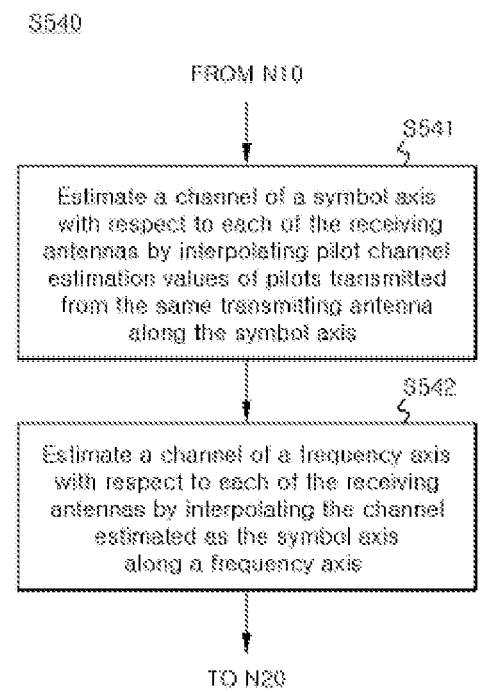
FIG. 22 is a detailed operational flowchart with respect to step S540 illustrated in FIG. 20.

FIG. 22 is a detailed operational flowchart with respect to step S540 illustrated in FIG. 20.

Referring to FIG. 22, in the step of estimating the channel with respect to each of the receiving antennas by employing the pilot channel estimation values of the pilots transmitted from the same transmitting antenna, a channel of a symbol axis with respect to each of the receiving antennas is estimated by interpolating pilot channel estimation values of pilots transmitted from the same transmitting antenna, of the pilots transmitted from the transmitting antenna that does not transmit a preamble, along a symbol axis (S541).

In this case, in the symbol axis, in the case of a channel not located between the pilot channel estimation values of the pilots transmitted from the same transmitting antenna, a pilot channel estimation value located at the nearest symbol index, of the pilot channel estimation values transmitted through the channel, can be copied to the channel not located between the pilot channel estimation values transmitted through the channel.

If the channel of the symbol axis is estimated, a channel of a frequency axis with respect to each of the receiving antennas is estimated by interpolating the channel, estimated as the symbol axis, as the frequency axis (S542).

In this case, in the case of a channel not located between the channels estimated as the symbol axis, the nearest channel of the channels estimated as the symbol axis can be copied to the channel not located between the estimated channels.

Figure 23:
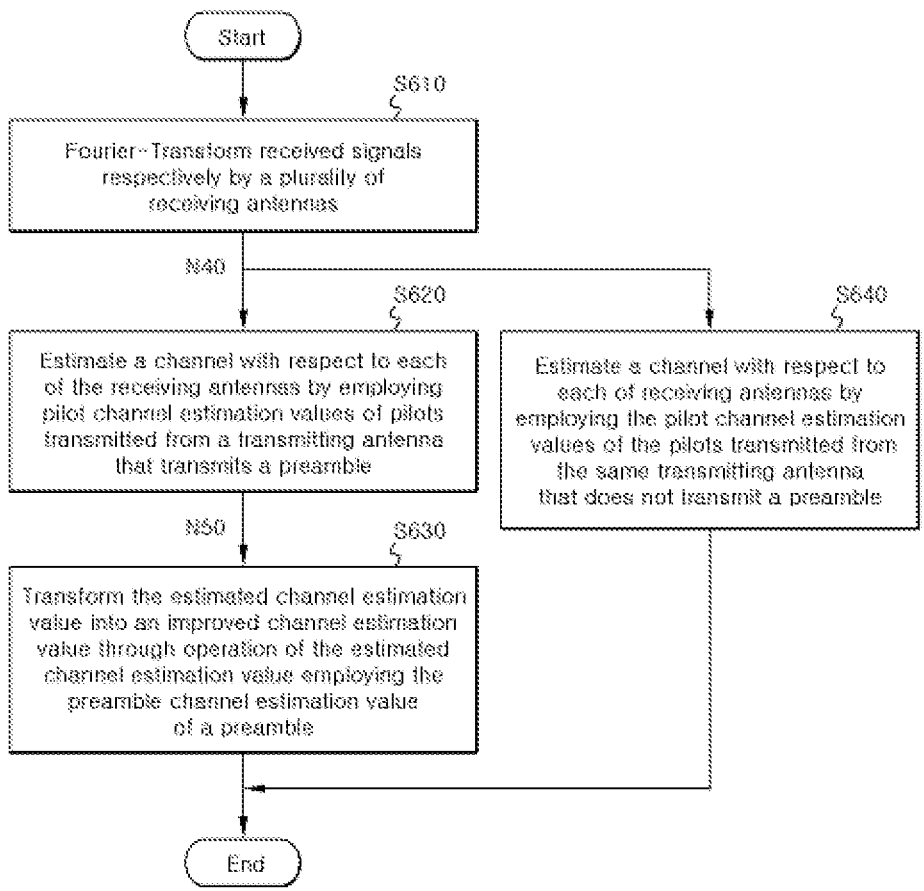
FIG. 23 is an operational flowchart with respect to a channel estimation method according to a second embodiment of the present invention.

FIG. 23 is an operational flowchart with respect to a channel estimation method according to a second embodiment of the present invention. For reference, the channel estimation method according to the second embodiment is concerned with the channel estimation apparatus according to the second embodiment.

Referring to FIG. 23, in the channel estimation method in accordance with the present invention, received signals received through the plurality of receiving antennas, respectively, are Fourier-transformed through FFT, and the received signals of the baseband are thus transformed into signals of a frequency band (S610).

A channel with respect to each of the receiving antennas is estimated by employing pilot channel estimation values of pilots transmitted from a transmitting antenna that transmits a preamble, of pilots included in the received signals transformed into the frequency band (S620).

In this case, the channel can be estimated by interpolating the pilot channel estimation values of the pilots transmitted from the transmitting antenna that transmits the preamble, along a symbol axis and a frequency axis.

A channel estimation value estimated with respect to each of the receiving antennas is calculated by employing a preamble channel estimation value, and an improved channel with respect to each of the receiving antennas is estimated through the operation (S630).

In this case, such transform of the estimated channel estimation value into the improved channel estimation value can be performed according to the above-mentioned Equations 4 and 5.

In this case, such operation of the estimated channel estimation value and the preamble channel estimation value is performed only when the preamble channel estimation value and the estimated channel estimation value are located at the subcarrier of the same frequency, so the estimated channel estimation value is transformed into the improved channel estimation value.

In the case of a channel estimation value estimated through interpolation of the pilot channel estimation value and the preamble channel estimation value, of the estimated channel estimation values, operation with the preamble channel estimation value is not performed. In other words, the estimated channel estimation value becomes an improved channel estimation value.

Step S640 of estimating a channel to which the preamble with respect to each of the receiving antennas has not been sent is performed simultaneously with step S620. That is, a channel with respect to each of the receiving antennas is estimated by employing pilot channel estimation values of pilots, which are transmitted from the same transmitting antenna, of the pilots transmitted from the transmitting antenna that has not sent the preamble (S640).

In this case, the channel can be estimated through interpolation of the symbol axis and the frequency axis employing the pilot channel estimation values of the pilots transmitted from the same transmitting antenna, and an operation thereof is the same as that of FIG. 22 and will be thus omitted.

It has been described in FIG. 23 that step S620 and step S640 are performed at the same time. However, this is only an example, and step S640 may be performed anterior to step S620 or step S640 may be performed posterior to step S630.

Figure 24:
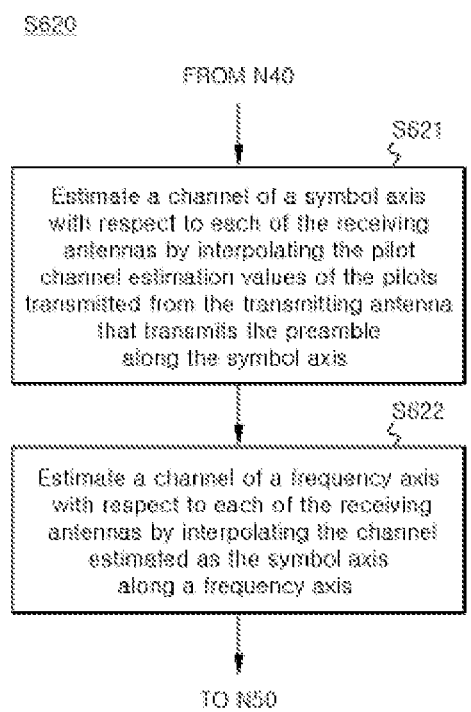
FIG. 24 is a detailed operational flowchart with respect to step S620 illustrated in FIG. 23.

FIG. 24 is a detailed operational flowchart with respect to step S620 illustrated in FIG. 23.

Referring to FIG. 24, the step of estimating an improved channel includes estimating a channel of a symbol axis with respect to each of the receiving antennas by interpolating the pilot channel estimation values of the pilots transmitted from the transmitting antenna that transmits the preamble as the symbol axis (S621).

In this case, in the case of a channel not located between the pilot channel estimation values of the pilots transmitted from the transmitting antenna that transmits the preamble in the symbol axis, a pilot channel estimation value located the nearest symbol index, of the pilot channel estimation values, can be copied to the channel not located between the pilot channel estimation values.

In this case, in the case of a channel located between a pilot channel estimation value having the smallest symbol index, of the pilot channel estimation values of the pilots transmitted from the transmitting antenna that transmits the preamble, and a preamble channel estimation value in the symbol axis, the channel can be estimated through interpolation of the pilot channel estimation value having the smallest symbol index and the preamble channel estimation value.

If the channel of the symbol axis is estimated, a channel of a frequency axis with respect to each of the receiving antennas is estimated by interpolating the channel, estimated as the symbol axis, as the frequency axis (S622).

In this case, in the case of a channel not located between channels estimated as the symbol axis, the nearest channel estimation value of the channel estimation values estimated as the symbol axis can be copied to the channel not located between the estimated channel estimation values.

Figure 25:
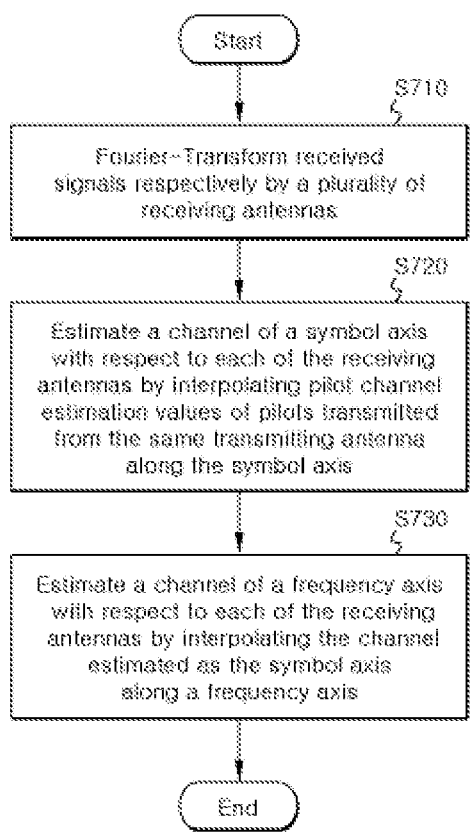
FIG. 25 is an operational flowchart with respect to a channel estimation method according to a third embodiment of the present invention.

FIG. 25 is an operational flowchart with respect to a channel estimation method according to a third embodiment of the present invention. For reference, the channel estimation method according to the third embodiment is concerned with the channel estimation apparatus according to the third embodiment.

Referring to FIG. 25, in the channel estimation method in accordance with the present invention, each channel is estimated by employing only pilot channel estimation values of pilots transmitted from the plurality of transmitting antennas.

The received signals of a time domain with the baseband are transformed into signals of a frequency band by Fourier-transforming the received signals respectively received by the plurality of receiving antennas through FFT (S710).

Channels of a symbol axis for the respective receiving antennas are estimated by interpolating pilot channel estimation values of pilots transmitted from the same transmitting antenna, of the pilots respectively included in the received signals of the receiving antennas, along a symbol axis (S720). In other words, channels of a symbol axis with respect to the two channels H00, H01 related to the first receiving antenna and the two channels H10, H11 related to the second receiving antenna are estimated.

In this case, in the symbol axis, in the case of a channel not located between pilot channel estimation values of pilots transmitted through a corresponding channel, a pilot channel estimation value located at the nearest symbol index, of the pilot channel estimation values of the pilots transmitted through the corresponding channel, can be copied to the channel not located between the pilot channel estimation values of the pilots transmitted through the corresponding channel.

If the channel of the symbol axis is estimated, a channel of a frequency axis with respect to each of the receiving antennas is estimated by interpolating the channel estimated as the symbol axis as the frequency axis (S730).

In this case, in the case of a channel not located between the channels estimated as the symbol axis, the nearest channel of the channels estimated as the symbol axis can be copied to the channel not located between the estimated channels.

Figure 26:
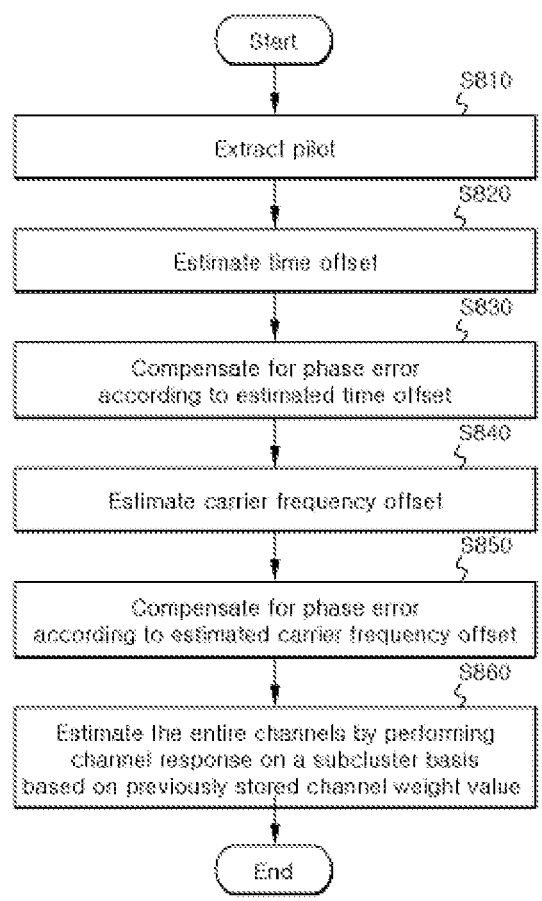
FIG. 26 is an operational flowchart with respect to a channel estimation method according to a fourth embodiment of the present invention.

Lastly, FIG. 26 is an operational flowchart with respect to a channel estimation method according to a fourth embodiment of the present invention. For reference, the channel estimation method according to the fourth embodiment is concerned with the channel estimation apparatus according to the fourth embodiment.

A pilot is extracted in the same manner as that of the Equation 1 described in step S810. In step S820, TO estimation is then performed using the extracted pilot (refer to the TO estimation unit). In step S830, phase error according to the estimated TO is then compensated for (refer to the TO compensation unit). In step S840, CFO is then estimated (refer to the CFO estimation unit). In step S850, phase error according to the estimated CFO is compensated for. Such compensation can be used to compensate for error of an oscillator through an AFC, etc. In this case, either the compensation step of CFO or the compensation step of TO may be performed first. Lastly, in step S860, the entire channels are estimated by performing a channel response per subcluster basis on the basis of a previously stored weight value (refer to the channel estimation unit and the weight value storage unit). Meanwhile, though not illustrated in FIG. 26, decoding may be performed on STC and SM, respectively, subsequently to step S860.

Meanwhile, functions used in an apparatus and a method disclosed in the present specification can be embodied in storage media that a computer can read as codes that the computer can read. The storage media that the computer can read, include all sorts of record devices in which data that can be read by a computer system is stored. Examples of the storage media that the computer can read, include ROMs, RAMs, CD-ROMs, magnetic tape, floppy discs, optic data storage devices, etc., and also, include things embodied in the form of carrier wave (e.g., transmission through the internet). Furthermore, the storage media that the computer can read is distributed in a computer system connected with networks. Then, the codes that the computer can read, are stored in the distributed storage media in a distribution scheme, and the codes can be executed in the distribution scheme.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

The invention claimed is:

1. A channel estimation apparatus in a wireless communication system, comprising:
   a first channel operation unit for carrying out an operation on pilot channel estimation value of pilots, which are transmitted from a transmitting antenna that transmits a preamble, as an improved pilot channel estimation value with respect to each of a plurality of receiving antennas by employing a preamble channel estimation value based on the preamble included in received signals received by the plurality of receiving antennas, respectively;
   a first channel estimation unit for estimating a channel for each of the receiving antennas through interpolation of a symbol axis and a frequency axis employing the improved pilot channel estimation value; and
   a second channel estimation unit for estimating a channel for each of the receiving antennas through interpolation of a symbol axis and a frequency axis employing pilot channel estimation values of pilots transmitted from the same transmitting antenna, of pilots transmitted from a transmitting antenna that does not transmit the preamble, of a plurality of transmitting antennas.

2. The channel estimation apparatus according to claim 1, wherein the first channel operating unit carries out an operation on the pilot channel estimation value as an improved pilot channel estimation value by employing the preamble channel estimation value only when the preamble estimation value and the pilot channel estimation values of the pilots transmitted from the transmitting antenna that transmits the preamble are located at the same frequency.

3. The channel estimation apparatus according claim 1, wherein the first channel estimation unit comprises:
   a first symbol index channel estimation unit for estimating a channel of the symbol axis with respect to each of the receiving antennas through interpolation of the symbol axis employing the improved pilot channel estimation value with respect to each of the receiving antennas; and
   a first frequency axis channel estimation unit for estimating a channel of the symbol axis with respect to each of the receiving antennas through interpolation of the frequency axis employing a channel estimation value estimated as the symbol axis with respect to each of the receiving antennas.

4. The channel estimation apparatus according to claim 1, wherein the second channel estimation unit comprises:
   a second symbol index channel estimation unit for estimating a channel of the symbol axis with respect to each of the receiving antennas through interpolation of the symbol axis employing the pilot channel estimation values of the pilots transmitted from the same transmitting antenna; and
   a second frequency axis channel estimation unit for estimating a channel of the frequency axis with respect to each of the receiving antennas through interpolation of the frequency axis employing a channel estimation value estimated as the symbol axis with respect to each of the receiving antennas.

5. The Channel estimation apparatus according to claim 1, wherein the pilot has a symbol structure related to downlink Partial Usage of Sub-Channel (PUSC) mode.

6. A channel estimation apparatus in a wireless communication system comprising:
   a first channel estimation unit for estimating a channel for each of a plurality of receiving antennas through interpolation of a symbol axis and a frequency axis employing pilot channel estimation values of pilots transmitted from a transmitting antenna, which transmits a preamble included in received signals received by the respective receiving antennas;

a first channel operation unit for estimating an improved channel with respect to each of the receiving antennas through operation of the estimated channel estimation value and a preamble channel estimation value of the preamble; and a second channel estimation unit for estimating a channel for each of the receiving antennas through interpolation of a symbol axis and a frequency axis employing pilot channel estimation values of pilots transmitted from the same transmitting antenna, of pilots transmitted from a transmitting antenna that does not transmit the preamble, of a plurality of transmitting antennas.

7. The channel estimation apparatus according to claim 6, wherein the first channel estimation unit comprises:

a first symbol index channel estimation unit for estimating a channel of the symbol axis with respect to each of the receiving antennas through interpolation of the symbol axis employing the pilot channel estimation values of the pilots; and a first frequency axis channel estimation unit for estimating a channel of the frequency axis with respect to each of the receiving antennas through interpolation of the frequency axis employing channel estimation values estimated along the symbol axis with respect to each of the receiving antennas.

8. The channel estimation apparatus according to claim 6, wherein the second channel estimation unit comprises:

a second symbol index channel estimation unit for estimating a channel of the symbol axis with respect to each of the receiving antennas through interpolation of the symbol axis employing the pilot channel estimation values of the pilots transmitted from the same transmitting antenna; and a second frequency axis channel estimation unit for estimating a channel of the frequency axis with respect to each of the receiving antennas through interpolation of the frequency axis employing a channel estimation value estimated as the symbol axis with respect to each of the receiving antennas.

9. The channel estimation apparatus according to claim 6, wherein the first channel operation unit estimates the improved channel by employing the preamble channel estimation value only when the preamble channel estimation value and the estimated channel estimation value are located the same frequency.

10. A channel estimation method in a wireless communication system, the method comprising the steps of:

carrying out an operation on pilot channel estimation values of pilots, which are transmitted from a transmitting antenna that transmits a preamble, as an improved pilot channel estimation value with respect to each of a plurality of receiving antennas by employing a preamble channel estimation value based on the preamble included in received signals received by the plurality of receiving antennas, respectively;

estimating a channel for each of the receiving antennas through interpolation of a symbol axis and a frequency axis employing the improved pilot channel estimation value; and estimating a channel for each of the receiving antennas through interpolation of a symbol axis and a frequency axis employing pilot channel estimation values of pilots transmitted from the same transmitting antenna, of pilots transmitted from a transmitting antenna that does not transmit the preamble, of a plurality of transmitting antennas.

11. The channel estimation method according to claim 10, wherein the step of carrying out an operation on pilot channel estimation values of pilots, which are transmitted from a transmitting antenna that transmits a preamble, as an improved pilot channel estimation value with respect to each receiving antennas comprises the step of carrying out an operation on the pilot channel estimation value as an improved pilot channel estimation value by employing the preamble channel estimation value only when the preamble channel estimation value and the pilot channel estimation values of the pilots transmitted from the transmitting antenna that transmits the preamble are located at the same frequency.

12. The channel estimation method according to claim 10, wherein the step of estimating a channel with respect to each of the receiving antennas through interpolation of a symbol axis and a frequency axis employing the improved pilot channel estimation value comprises the steps of:

estimating a channel of the symbol axis with respect to each of the receiving antennas through interpolation of the symbol axis employing the improved pilot channel estimation value with respect to each of the receiving antennas; and estimating a channel of the frequency axis with respect to each of the receiving antennas through interpolation of the frequency axis employing a channel estimation value estimated as the symbol axis with respect to each of the receiving antennas.

13. The channel estimation method according to claim 10, wherein the step of estimating a channel with respect to each of the receiving antennas through interpolation of a symbol axis and a frequency axis employing pilot channel estimation values of pilots transmitted from the same transmitting antenna comprises the steps of:

estimating a channel of the symbol axis with respect to each of the receiving antennas through interpolation of the symbol axis employing the pilot channel estimation values of the pilots transmitted from the same transmitting antenna; and estimating a channel of the frequency axis with respect to each of the receiving antennas through interpolation of the frequency axis employing a channel estimation value estimated as the symbol axis with respect to each of the receiving antennas.

* * * * *